United States Patent [19]

Mizoguchi et al.

[11] Patent Number: 5,557,629
[45] Date of Patent: Sep. 17, 1996

[54] LASER DEVICE HAVING AN ELECTRODE WITH AUXILIARY CONDUCTOR MEMBERS

[75] Inventors: Hakaru Mizoguchi; Yoshiho Amada; Noritoshi Ito, all of Hiratsuka, Japan

[73] Assignee: Kabushiki Kaisha Komatsu Seisakusho, Tokyo, Japan

[21] Appl. No.: 937,611

[22] Filed: Aug. 28, 1992

[51] Int. Cl.⁶ .................................................. H01S 3/097
[52] U.S. Cl. ............................................. 372/87; 372/83
[58] Field of Search .................................. 372/87, 86, 81, 372/83

[56] References Cited

U.S. PATENT DOCUMENTS 4,953,174  8/1990  Eldridge et al. ............................. 372/87
4,959,840  9/1990  Atkins ........................................ 372/57

OTHER PUBLICATIONS

"Testing a XeCl Laser: 10 Billion Laser Pulses" Sep., 1988 A publication by Lambda Physki–Lambda Industrial No. 3; 8 pages.

*Primary Examiner*—James W. Davie
*Attorney, Agent, or Firm*—Baker & Daniels

[57] ABSTRACT

A laser device is capable reducing fluctuation of the beam width of the output laser beam due to abrasion of its discharge electrodes. A part of the contour shape of a section perpendicular to the longitudinal axis of the chamber of the laser device in at least one of the electrodes, which part confronts the other one of the electrodes, has a shape of a circular arc having a predetermined radius. The width of at least one of the two electrode may be substantially equal to the width of electric discharge taken place between the electrodes. Further, a conductor member may be disposed on each side of the electrode along its longitudinal axis to reduce electric field strength therearound.

9 Claims, 22 Drawing Sheets

ELECTRODE DISCHARGE PORTION

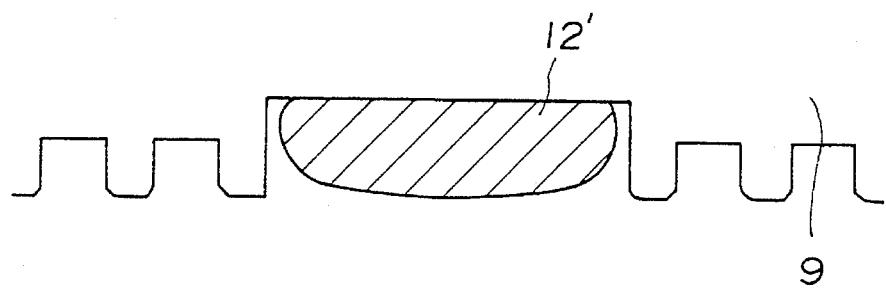
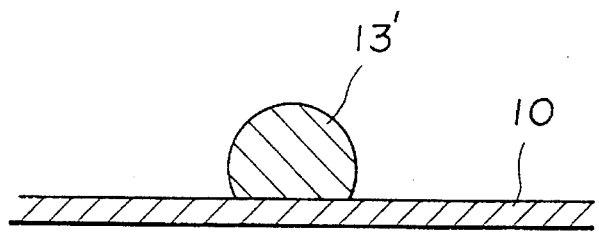
FIG. 2
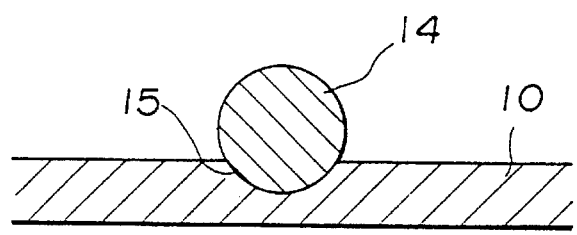
FIG. 3
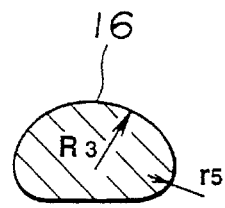 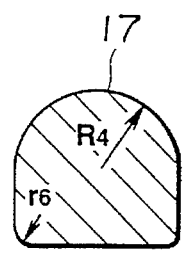
FIG. 4(a)   FIG. 4(b)

CIRCULAR SECTION

[r = 1]

ELLIPTIC SECTION

[r = 2]

ELLIPTIC SECTION

[r = 4]

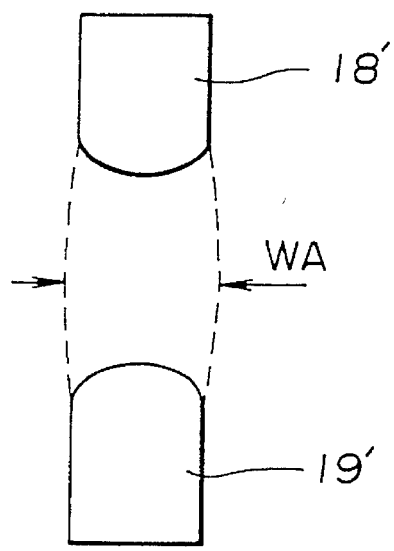
FIG.10
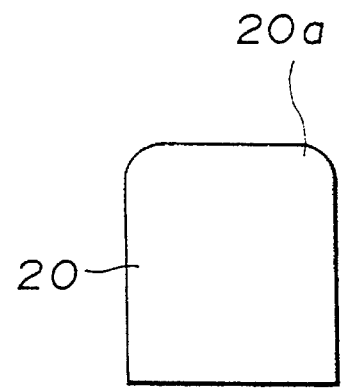 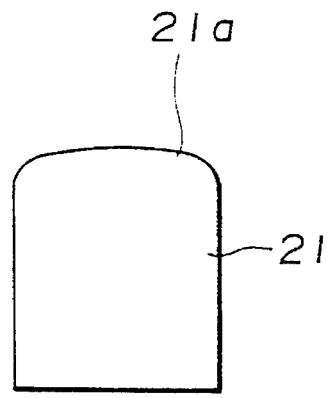
FIG.11(a)   FIG.11(b)

LASER DEVICE HAVING AN ELECTRODE WITH AUXILIARY CONDUCTOR MEMBERS

BACKGROUND OF THE INVENTION

1. Field of the Invention

This invention relates to a discharge pumped laser device used for light sources for machining works, projection light, etc. and more particularly to discharge electrodes in the laser device which minimize the fluctuation of the beam width of the laser beam due to the abrasion of the electrodes.

2. Description of the Related Art

A discharge pumped laser device is used for machining of works such as marking, cutting and welding, and also used as a light source for optical lithography to transcribe circuit patterns for large scale integrated circuits.

For machining works, carbon dioxide lasers, excimer lasers, etc., are used. For optical photolithography, a reduction projection process is typically used. In the reduction projection process, light irradiated on and passed through a reticle pattern is projected through a reduction projection aligner onto a photo-sensitive material deposited on a semiconductor substrate to thereby form a circuit pattern. The resolution of the projected image is inverse proportional to the wavelength of light; therefore, the wavelength of light has been shifted from a visible region to an ultraviolet region in order to improve the resolution.

Conventionally, g-line (having a wavelength of 463 nm) and i-line (having a wavelength of 365 nm), which are produced by a high pressure mercury lamp, are used as an ultraviolet light source. However, for the production of a 64 megabyte memory, the line width is 0.25 m or less at the minimum pattern. Therefore, a light source having a wavelength shorter than those of the i-line has been expected.

A deed ultraviolet (deep-UV) laser light source is now considered promising to break the technological limit for shorter wavelength. Especially, the excimer laser produces high output with high efficiency. It provides strong oscillation at short wavelengths in a certain composition of the medium gas such as KrF (wavelength of 246 nm) and ArF (wavelength of 193 nm).

However, the selection of glass and crystalline materials which constitute the reduction projection lens system is greatly restricted in the deep-UV region. Therefore, the correction of the chromatic aberration is difficult to perform in the reduction projection lens system which uses a mercury lamp. In place of correcting the chromatic aberration of the lens system, a wavelength selection device such as an etalon is disposed in the laser cavity (resonator) to thereby reduce the spectrum width of the output light to such an extent that the chromatic aberration is negligible. According to this method, the output having a spectrum width of several nanometers in the natural oscillation can be reduced to a narrow band of several picometers. To reduce the bandwidth, it has been proposed the methods in which one or more Fabry-Perot etalons including a pair of parallel reflective films are provided the cavity or a diffraction grating is used as a total reflection mirror.

The former method uses a plurality of etalons which are superposed to each other. This method can reduce the bandwidth relatively easily. However, since the optical intensity between the reflective films is very high, the durability of the reflective films and a drift due to the loss become problems when high output is to be produced.

The latter method using a diffraction grating can achieve wavelength selection by a single reflection on the diffraction grating surface so that the optical intensity is lower than that of the former method. As a result, the load on the reflective surface is small. Further, since the reflection takes place only one time, a loss at the reflective surface is low and high output is obtained. Because of these advantages in the latter method, a narrow band excimer laser device widely employs a diffraction grating as a light source for optical lithography.

Referring to FIG. 23(a), a narrow band excimer laser is of a discharge pumped type in which laser oscillation is performed by discharging and pumping a laser gas such as KrF filled in a laser chamber 1 through a pair of electrodes 6, 7 disposed above and below the laser chamber along the longitudinal axis of the chamber. A discharge pumped region 11 is shown enclosed by the broken lines. As discharge advances, the opposing surfaces 6a, 7a of the electrodes 6, 7 are abraded and the discharge width WA changes. Along with the change in discharge width, the beam width of the output laser light 4 changes, which is a problem in terms of stabilization of the beam width.

When this laser is used for machining works, due to the change in the beam width, the transverse mode is deteriorated, the beam condensing performance is changed, and the output is changed. This causes a practical problem. Especially, when this laser is used as a light source for optical photolithography, a change in the beam width would cause the following undesirable problems in the practical use of the narrow band excimer laser.

To reduce the bandwidth, the diffraction grating 5 (FIG. 23(a)) is used as a wavelength selective device and high order diffraction is used in the diffraction grating, so that angular dispersion at the operating point becomes large and the divergent angle of the laser beam directly influences the spectrum width. When the divergent angle is large, the Spectrum width would increase. Therefore, when the discharge width, that is the gain region, changes, the divergent angle of the laser beam changes, so that the spectrum width greatly changes. In order to avoid this change, an aperture 8 (FIG. 23(a)) is conventionally provided to stabilize the gain width. In a so-called Chang type electrodes used conventionally, the discharge width would greatly increase inevitably in the abraded electrodes when the output is increased. As a result, it becomes difficult to control the output due to the restriction on the gain by the aperture 8.

The mechanism of enlarging the discharge width will now be described. Townsent's theory is known as a macroscopic phenomenological theory which explains discharge, and is useful for understanding discharge phenomena. In this theory, a gas including a halogen used in the excimer laser is called a negative gas. Electrons produced by the collision and ionization of the electrons (ionization coefficient: $\alpha$) in the discharge process by a large electron affinity of halogen are captured (electron attachment coefficient: $\eta$) to reduce an apparent ionization coefficient ($\alpha - \eta$) to thereby facilitate condensation of the discharge. The relationship between these coefficients and electric field strength E is shown in FIG. 24. in which a reference character P denotes a normalization coefficient.

As seen from FIG. 24, the ionization coefficient is greatly dependent on the electric field strength E while the electron attachment coefficient $\eta$ is not substantially dependent on the electric field strength E, so that the apparent ionization coefficient ($\alpha - \eta$) rapidly increases in excess of a certain electric field strength and greatly depends on the electric field strength E. Thus, the parameter ($\alpha - \eta$) which drives the discharge changes in accordance with the electric field strength distribution on the surface of the electrodes, so that the discharge width is greatly influenced by the electric field strength distribution on the electrode surface. In order to ensure the discharge width, a uniform large electric field strength region transverse to the electrodes of the discharge pumped type laser device is required to be provided as its electrode shade. Conventionally, the shades of Chang and modified Chang electrodes are used on the basis of the analysis of the electric field under ideal conditions.

FIG. 25(a) shows a potential distribution derived from the electric field calculation in the case of a modified Chang type electrodes, in which L1 . . . denotes equipotential lines. It will be seen from FIG. 25(a) that the potential distribution between a cathode (upper electrode) 6 at high negative potential and an anode (lower electrode) 7 is greatly bent by a metal plate on which the anode 7 is placed, a current return lead 10 and an insulating member 9. In the actual configuration, the existence of such leads and isolation causes the electric field to deviate from an ideal Chang type electric field.

FIG. 25(b) shows equifield strength line L2 . . . in the vicinity of the cathode electrode 6 while FIG. 25(c) shows changes in the electric field strength along the surface of the cathode electrode 6. As seen from FIG. 25(b), the electric field strength on the surface of the electrode 6 does not so often intersect the equifield strength lines in the region ranging from the electrode central point A to about ⅓ of the right half electrode width and a uniform electric field is formed in that region.

As shown by a line L3 in FIG. 25(c), the electric field intensity initially rises very slowly from the electrode central point A toward the right-hand electrode end point B and then rises more rapidly closer to the end point. FIG. 25(d) shows an equifield strength line L4 . . . in the vicinity of the anode electrode 7. FIG. 25(e) shows changes in the electric field strength along the electrode surface. The electric field strength at the center A is denoted by $E_0$. As shown by these figures, the electric field strength is uniform in the first rightward section of about 4 mm starting from the electrode central point A. It then becomes slowly lower toward the right-hand end B and becomes rapidly lower after a distance of about 12 mm (see lines L4, L5). This is a trend reverse to that in the case of the cathode 6. Discharge occurs at the central portion of the electrode. The factor of restricting the discharge width is considered to be on the anode 7 side where its central portion is at high electric field strength.

After $1 \times 10^8$ shots, the shape of the abraded electrode central portion was measured and the electric field strength distribution in the abraded electrode central portion was calculated by using finite element method on the basis of the measured shape data.

FIGS. 26(a) and 26(b) show the result of this simulation in which the axis of abscissa expresses a rightward distance from the center A and the ordinate axis shows the ratio of a change $\Delta E$ in the electric field strength E to electric field strength $E_0$ at the central point A (%). FIG. 26(a) concerns the cathode 6 while FIG. 26(b) concerns the anode 7. The white dot shows the state of new electrode while the black dot shows the state after $1 \times 10^8$ shots.

As seen from these figures, abrasion has increased after $1 \times 10^8$ shots, so that a uniform electric field has extended in the vicinity of the central point compared with that of new electrode. The width of this uniform electric field portion corresponds to the observed beam width. In this respect, it is considered that an electric current is concentrated at the uniform electric field portion which is a strong electric field and abrasion has increased to thereby form a wide uniform electric field portion.

As described above, when the operation of the laser device starts, the conventional electrode is abraded as time passes to thereby increase the area of the uniform electric field portion and to cause the fluctuation of the beam width of the output laser beam.

SUMMARY OF THE INVENTION

The present invention is made in view of the above-described situations in the conventional art, and it is an object of the present invention to provide a laser device which reduces fluctuations in the laser beam width caused by the electrode abrasion.

According to the first aspect of the present invention, there is provided a laser device of the type in which electric discharge takes places between a pair of electrodes to excite a laser gas in the laser chamber thereby producing laser beam, wherein the width of at least one of the pair of electrodes substantially equal to the width of the electric discharge.

With this construction, even if electrode has been abraded due to discharge across the confronting surfaces of the electrodes, a uniform electric field strength range is difficult to extend. Thus, fluctuation in the spectrum width of the laser beam due to the electrode abrasion is minimized.

According to the second aspect of the present invention, there is provided a laser device of the type in which discharge takes places between a pair of electrodes to excite a laser gas in the laser chamber thereby producing a laser beam, characterize in that the width of at least one of the pair of electrodes substantially coincides with the discharge width.

With this construction, the discharge width becomes a constant value which corresponds to the electrode width. Therefore, the beam width of the output laser beam is constant to thereby operate the laser device in a stabilized manner.

According to the third aspect of the present invention, there is provided a laser device of the type in which electric discharge takes place between a pair of electrodes to excite a laser gas in the laser chamber thereby producing laser beam, wherein the width of at least one of the pair of electrodes substantially equal to the width of the electric discharge and wherein there is further provided with a pair of conductor members disposed on respective sides of said at least one of the electrodes along the longitudinal axis of said one electrode.

With this construction, the discharge width becomes a constant value which corresponds to the electrode width. Therefore, the width of the output laser beam is constant to thereby operate the laser device in a stabilized manner. Further, the abrasion rate of the electrode is suppressed to a small value because the electric field is eased by the conductors disposed on the respective sides of the electrode to thereby reduce contaminations generated from the electrodes.

BRIEF DESCRIPTION OF THE DRAWINGS

FIGS. 2–4(a) and (b) show the cross-sectional views of the sectional configurations of examples of the electrodes;

FIGS. 10 and 11 (a), (b) show other examples of the shape of the electrode;

DETAILED DESCRIPTION OF THE EMBODIMENTS

Figure 1A:
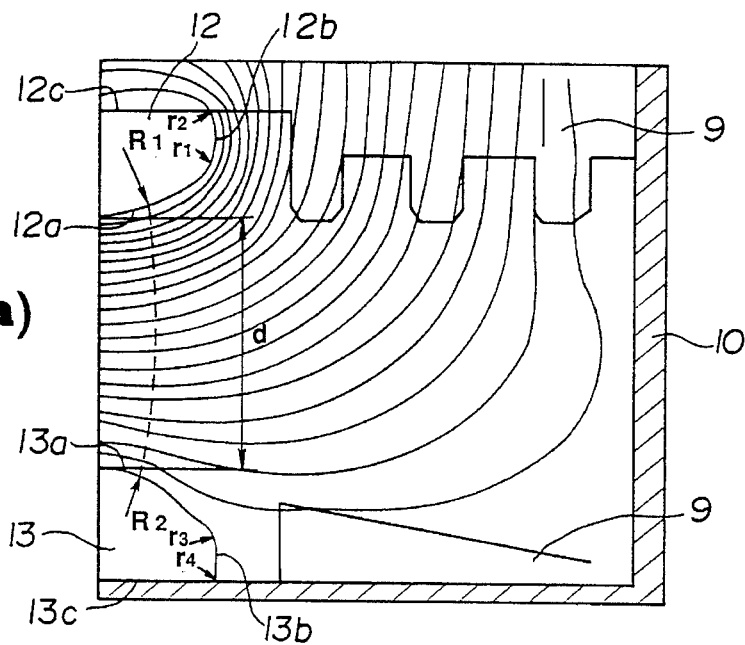
FIG. 1(a) shows the distribution of equipotential lines in the vicinity of electrodes used in the first embodiment of a laser device according to the present invention.

Referring to the drawings, embodiments of the laser device according to the present invention will be described hereinafter. In the embodiments, the laser device is assumed to be a narrow band oscillation excimer laser. The excimer laser of the embodiments to be described below is basically the same structure as the conventional example of FIG. 23(a). Reference numerals 1, 2, 4, 8 and 11 denote similar elements of the embodiments of the present invention and the example of the conventional device.

Figure 23B:
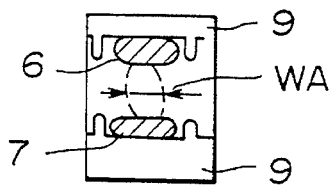
FIG. 23(b) is a cross-sectional view taken along the line C—C of FIG. 23(a)

In a first embodiment, as shown in FIG. 1(a), electrodes 12 and 13 are used in place of electrodes 6 and 7 in FIG. 23(b), respectively. Referring to FIG. 23(a), a laser chamber 1 is filled with a laser gas, for example, of KrF, which is discharged and pumped for laser oscillation through the electrode 12 (cathode electrode) and the electrode 13 (anode electrode) disposed above and below the laser chamber 1 along the longitudinal axis of the laser chamber. The laser beam is resonated by a light resonator (cavity) composed of the laser chamber 1, a front mirror 2 and a grating 5 which is a wavelength selective element, and output as an effective laser beam 4 from the front mirror 2. The grating 5 reduces the bandwidth of the oscillating beam and also functions as a rear mirror, which is disposed in so-called Littrow arrangement.

Figure 23C:
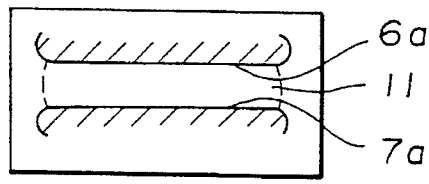
FIG. 23(c) is a longitudinal cross-sectional view of FIG. 23(a)
Figure 23A:
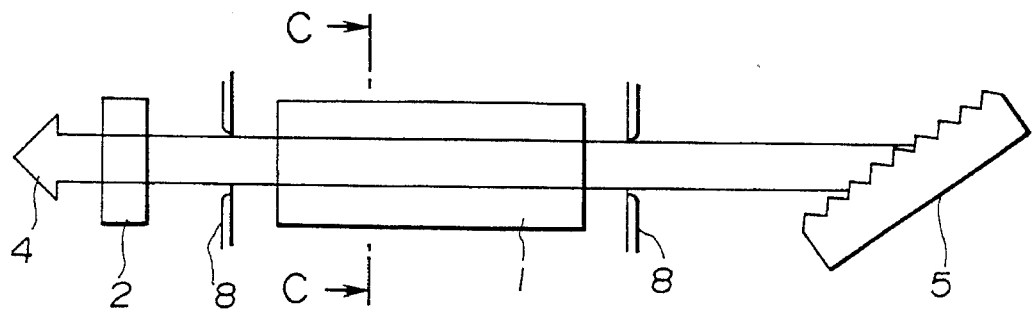
FIG. 23(a) shows the overall structure of a conventional laser device.
Figure 24:
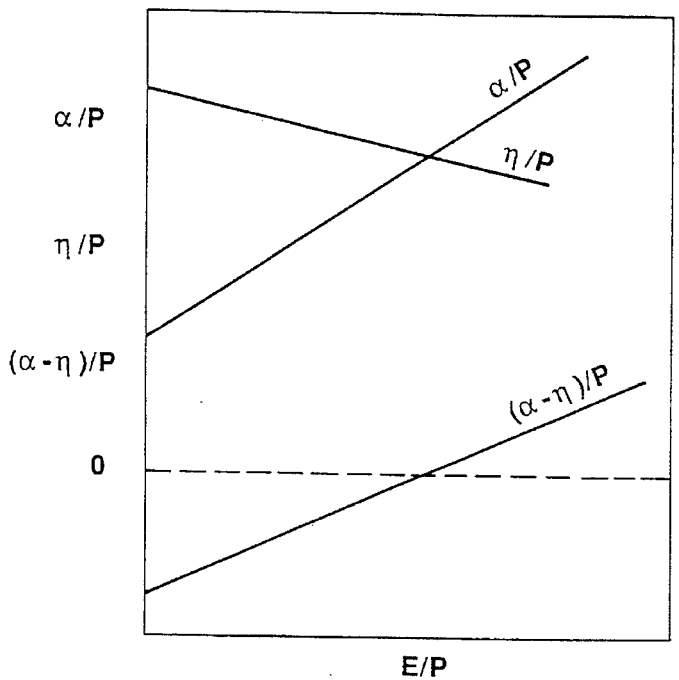
FIG. 24 is a graph of field strength dependency of the ionization coefficient $\alpha$, attachment coefficient $\eta$ and apparent ionization coefficient $\alpha - \eta$ in the gas discharge of an excimer laser.

In FIGS. 23(a)–(c), an area 11 enclosed by the broken line is a discharge pumped region; reference numeral 8 denotes an aperture; and WA denotes a discharge width. In FIG. 1(a), reference numeral 9 denotes an insulating member; 10 denotes an anode current return lead.

In the second and third embodiments to be described later, the reference numerals 9 and 10 denote members same as those in the first embodiment. The sections of the electrodes 12, 13 perpendicular to the longitudinal axis of the laser chamber 1 are each in lateral symmetrical. Therefore, the potential distribution during the operation of the laser device is also in lateral symmetry around the central axis of the section. Thus, only the potential distribution on the right-half portion of the electrodes 12, 13 is shown in FIG. 1(a).

The upper portion of FIG. 1(a) shows the cathode electrode 12 having a confronting surface 12a in the shape of circular arc with a radius $R_1$ (of 13 mm). The cathode electrode side 12b and bottom 12c are each composed of a straight line while the confronting surface 12a and the side surface 12b are connected by an arc with a radius of $r_1$ while the side 12b and the bottom surface 12c are connected with an arc of a radius $r_2$. These radii $r_1$, $r_2$ are set to predetermined values which are smaller than the radius $R_1$ of the surface 12a. The lower portion of FIG. 1(a) shows an anode electrode 13 which has a width of 8 mm, and a confronting surface 13a in the shade circular arc with a radius $R_2$ (of 9 mm). The anode electrode 13 has a side surface 13b and a bottom surface 13c, each of which is composed of a straight line. The confronting surface 13a and side surface 13b are connected by an arc of a radius $r_3$ while the side surface 13b and bottom surface 13c are connected by an arc of a radius $r_4$. The radii $r_3$, $r_4$ are set to predetermined values which are smaller than the radii $R_2$ of the confronting surface 13a. The inter-electrode distance d between the cathode and anode electrodes 12 and 13 is 20 mm. All radii $R_1$, $R_2$, $r_1$, $r_2$, $r_3$ and $r_4$ of the arcs are smaller than the inter-electrode distance d.

Figure 25A:
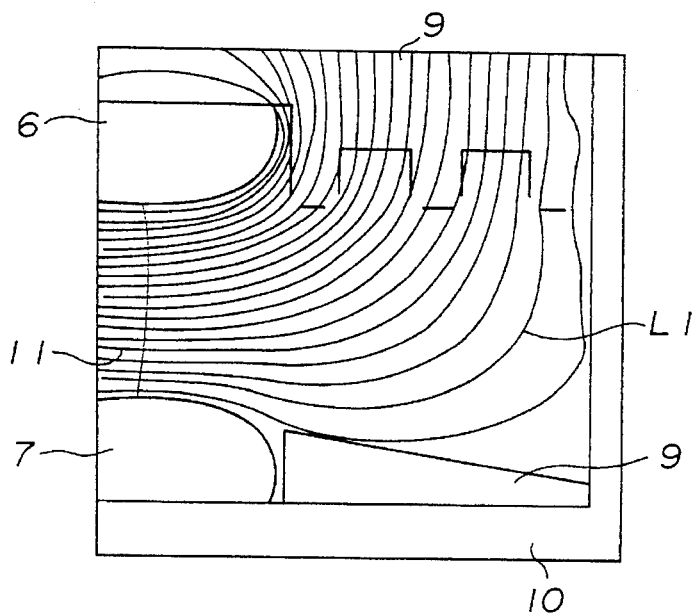
FIGS. 25(a)–(e) show the distributions of potential lines in the vicinity of the electrodes, the distribution of a field strength in the vicinity of the cathode electrode, a change in a field strength on the confronting surface of the cathode electrode, the distribution of a field strength in the vicinity of the anode electrode, a change in a field strength on the confronting surface of the anode electrode.
Figure 25B:
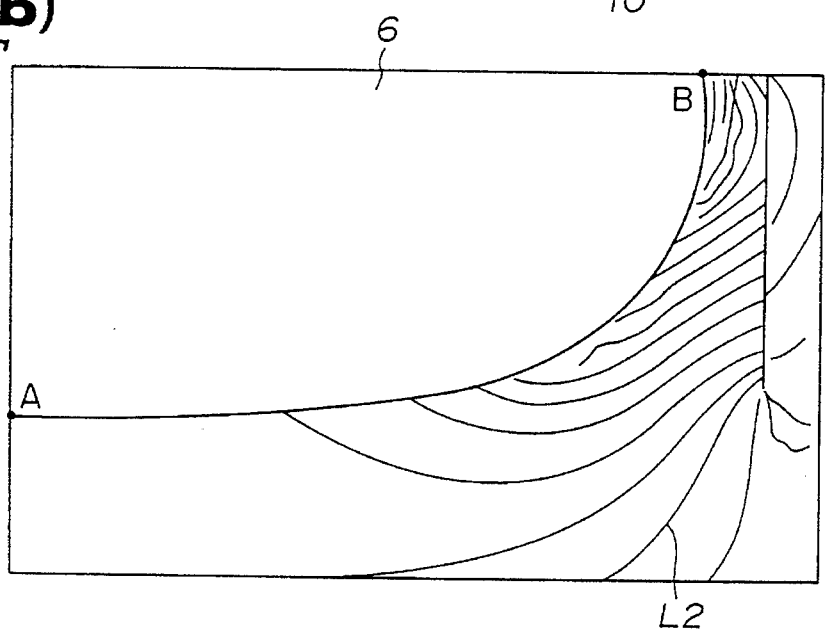
Figure 25C:
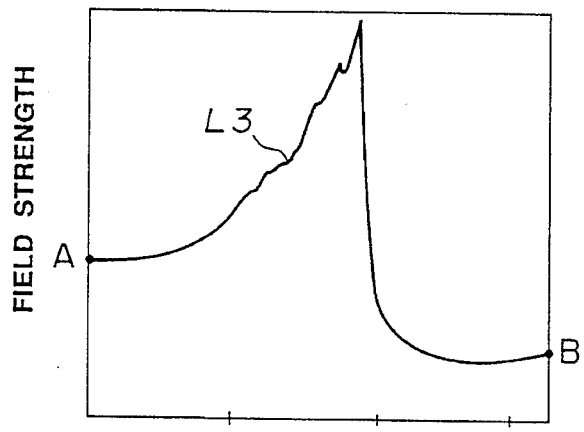
Figure 25D:
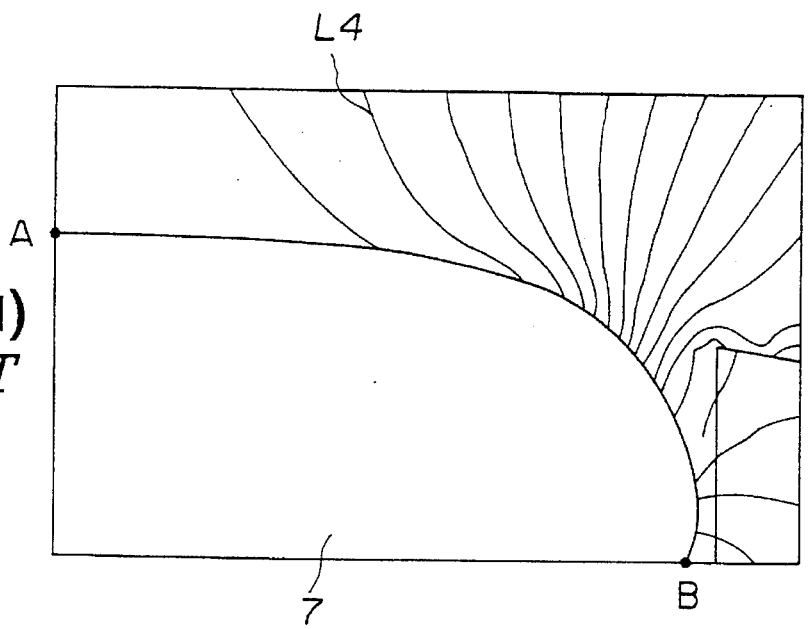
Figure 25E:
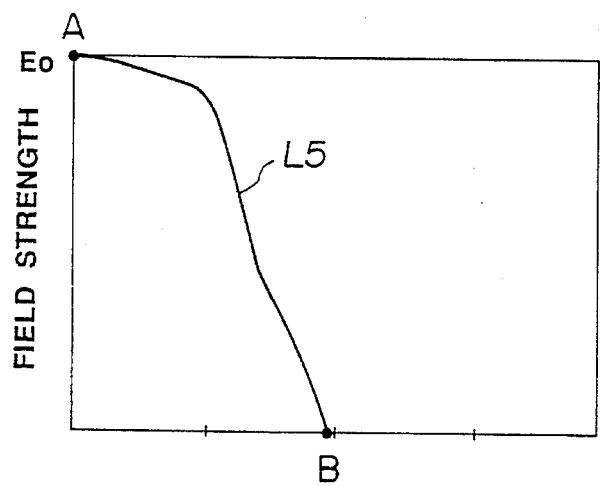
Figure 26A:
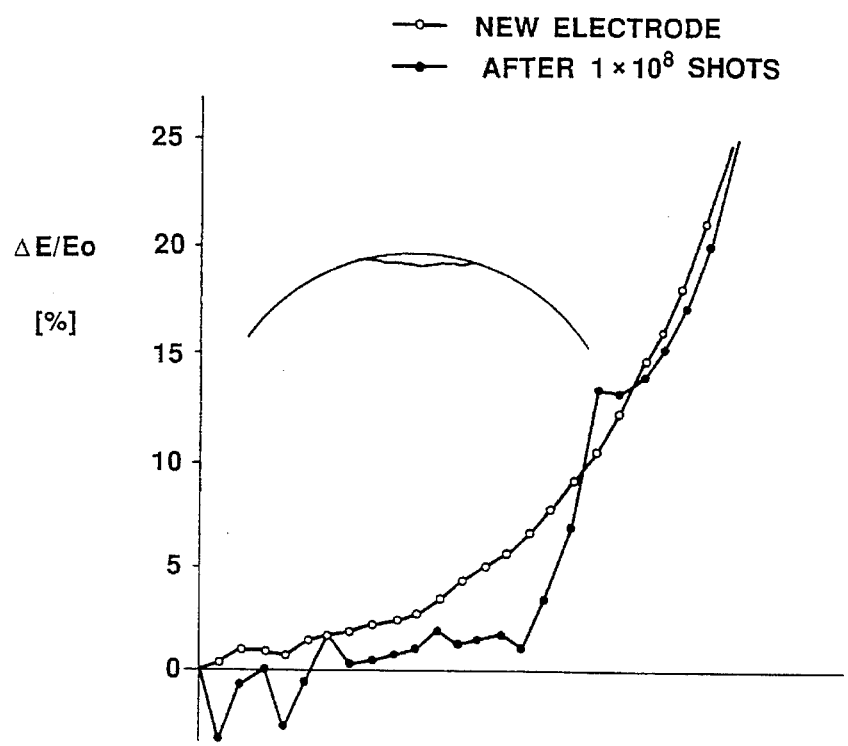
FIGS. 26(a) and 26(b) are graphs of a change rate in a field strength on a surface of a new electrode with conventional shape and that after $1 \times 10^8$ shots.
Figure 26B:
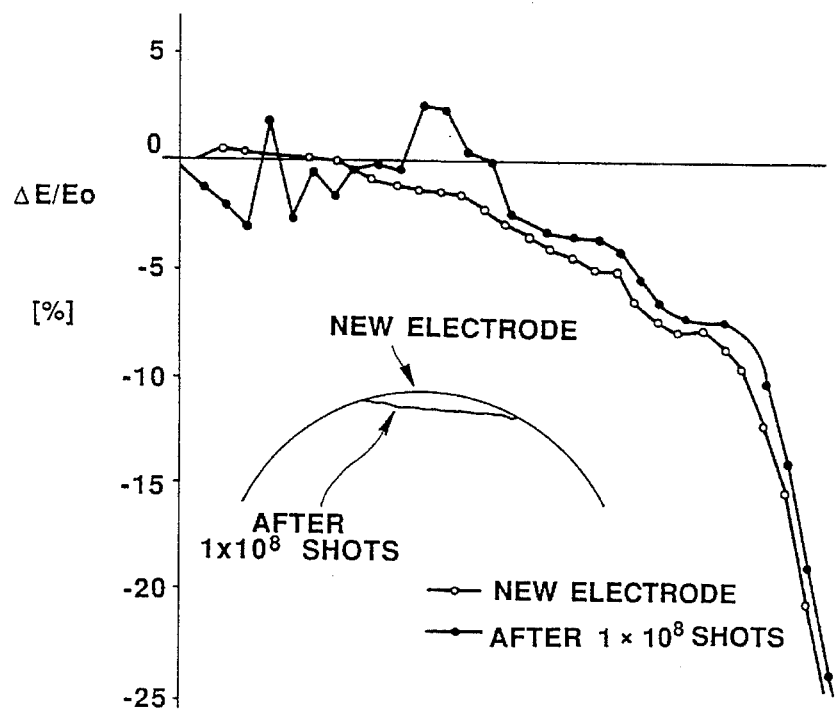

As shown in FIG. 1(a), the tendency of the equipotential lines is similar to that of the conventional one shown in FIG. 25(a). Because the distance between the cathode 12 and the insulating member 9 is larger than that in FIG. 25(a), the potential gradient at the electrode 12 side is lower than that in FIG. 25(a). For the anode 13, the potential gradient decreases from its central portion toward the right end.

Figure 1B:
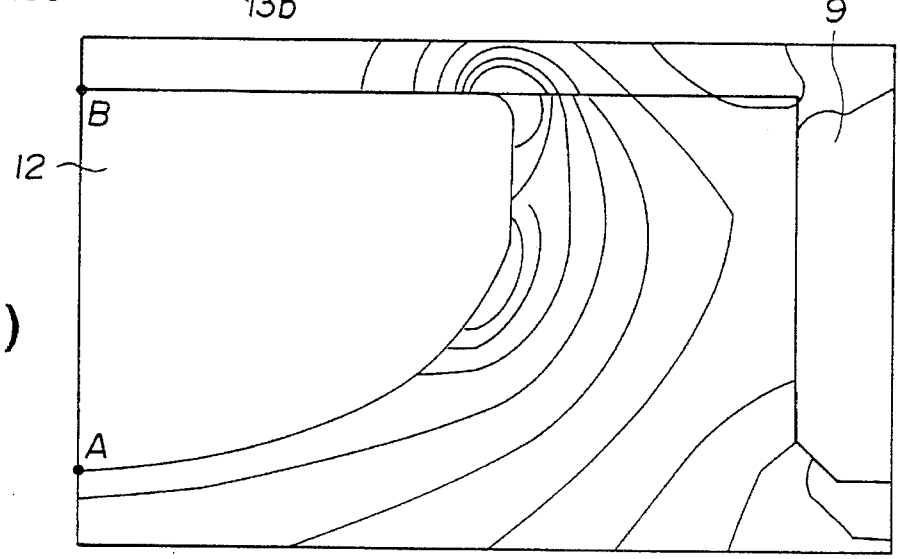
FIG. 1(b) shows the distribution of the electric field strength in the vicinity of the cathode electrode in FIG. 1(a)
Figure 1C:
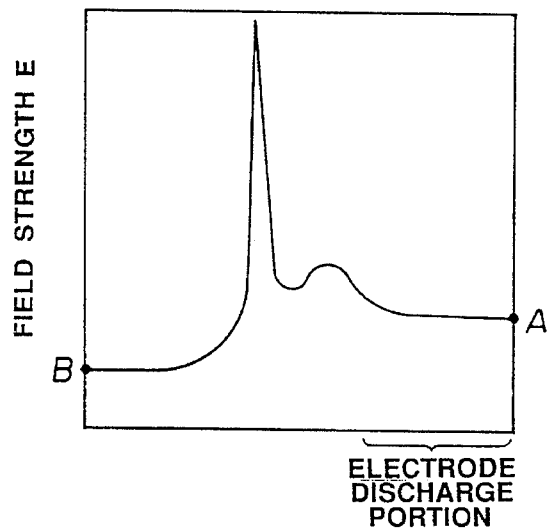
FIG. 1(c) is a graph illustrating the changes in the electric field strength along the surface of the cathode electrode.
Figure 1D:
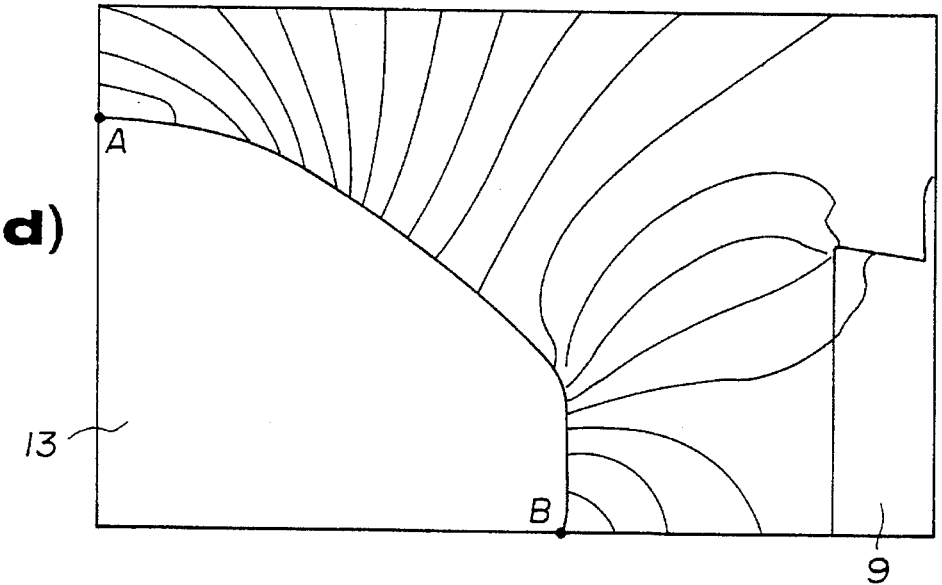
FIG. 1(d) shows the distribution of the electric field strength in the vicinity of the anode electrode.
Figure 1E:
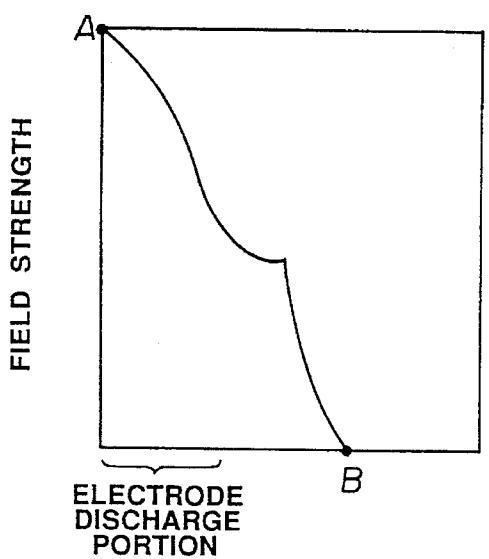
FIG. 1(e) is a graph illustrating the changes in the electric field strength along the surface of the anode electrode.

FIGS. 1(b) and 1(d) shows a distribution of the electric field strength in the vicinity of the cathode 12 and anode 13 on enlarged scale. It will be seen that a relatively wide uniform field region is established in the cathode 12 while in the anode 13 the field strength rapidly decreases from the central portion of the anode toward its right-hand end. FIG. 1(c) shows the field strength along the surface of the cathode electrode 12. It will be seen that a uniform field region is established through a region ranging from the central point A to the right-hand point distant by 7–8 mm from the central point. FIG. 1(e) shows the field strength on the surface of the anode electrode 13. A uniform field region is established in a very narrow area ranging from the central point A to a rightward point distant by 1–2 mm from the central point, and the field strength is rapidly reduced from that right-hand point toward the periphery of the anode electrode. It will be understood that discharge occurs as concentrated in the central narrow region. In any event, the field strength rapidly decreases with the electrodes 12 and 13 toward the peripheries of their confronting surfaces. Therefore, a narrow band oscillation excimer laser device is realized where even if electrode abrasion occurs due to discharge, a uniform field portion is difficult to extend to thereby minimize fluctuations in the spectrum width due to the electrode abrasion.

Although in the first embodiment both electrodes are shown as having arcuate confronting cross-sections and a straight-line side surface, and the arc surface and the straight line side surface are connected by an arc, only one of those electrodes may take such configuration as shown in FIG. 2. If the anode electrode 13' has such configuration, a more advantageous result is obtained than the case where the cathode electrode has such configuration.

While in the first embodiment the configuration of the electrode cross-section is shown as having a straight line, it may be a complete circle as shown in FIG. 3 in which an anode current return lead 10 may have a concavity 15 corresponding to the size of the circle so as to hold and fix the electrode 14 therein. Thus, the electrode 14 is easy to manufacture.

The sectional configuration of the electrode is not limited to the above-described one. As shown in FIG. 4(a), an electrode 16 may have an confronting surface formed by an arc with a radius $R_3$ and a bottom surface formed by a straight line, the arc and straight line being connected by an arc with a radius $r_5$. FIG. 4(b) show an electrode 17 which has an confronting surface formed by an arc with a radius $R_4$ and a side surface formed by a straight line which is connected smoothly with the arc with a radius $R_4$, with the side surface and the bottom which are both straight lines being connected by an arch with a radius $r_6$.

In summary, the electrode may take any configuration as long as it has at least an arcuate confronting surface where a straight line is connected smoothly with an arc or where straight lines are connected smoothly to each other.

Figure 5A:
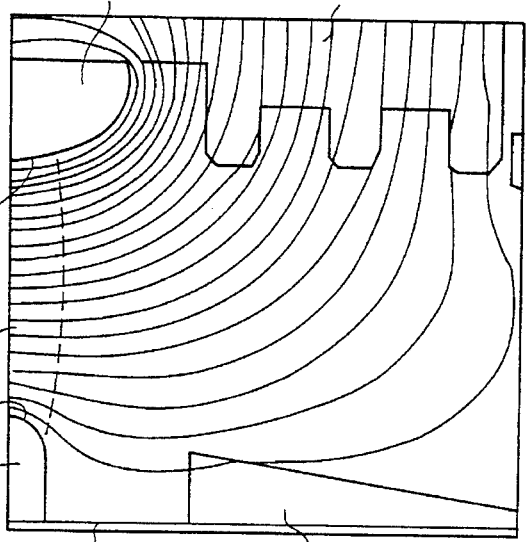
FIGS. 5(a)–(c) show the distribution of equipotential lines in the vicinity of electrodes used in a second embodiment of a laser device according to the present invention.
Figure 5B:
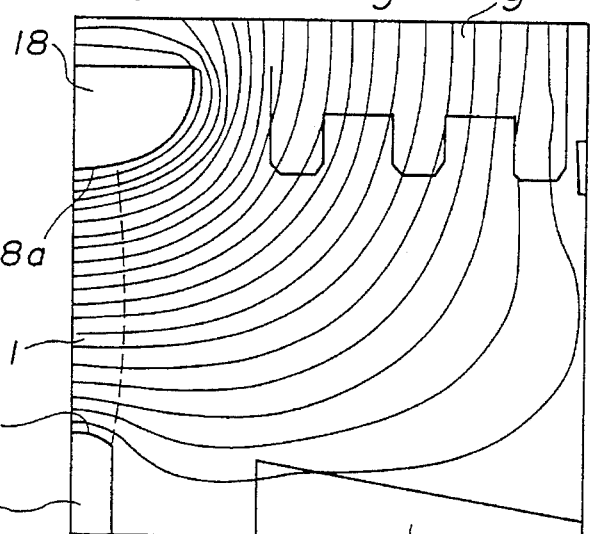
Figure 5C:
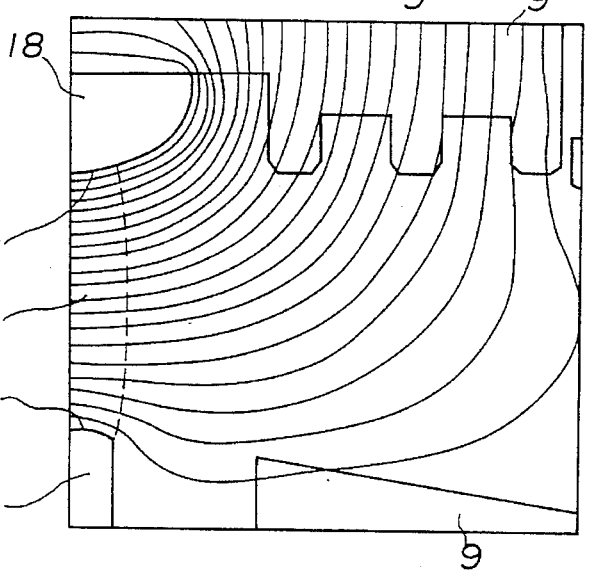
Figure 6A:
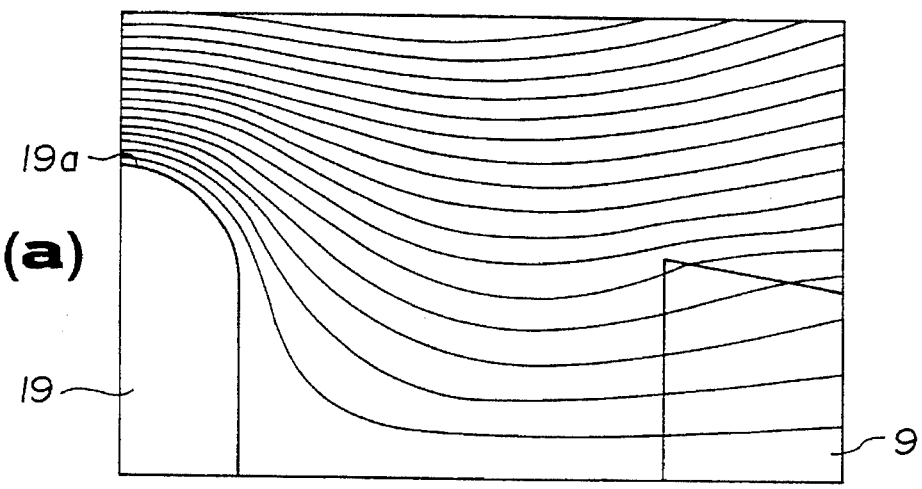
FIGS. 6(a)–(c) show the distribution of equipotential lines in the vicinity of the anode electrode in FIG. 5.
Figure 6B:
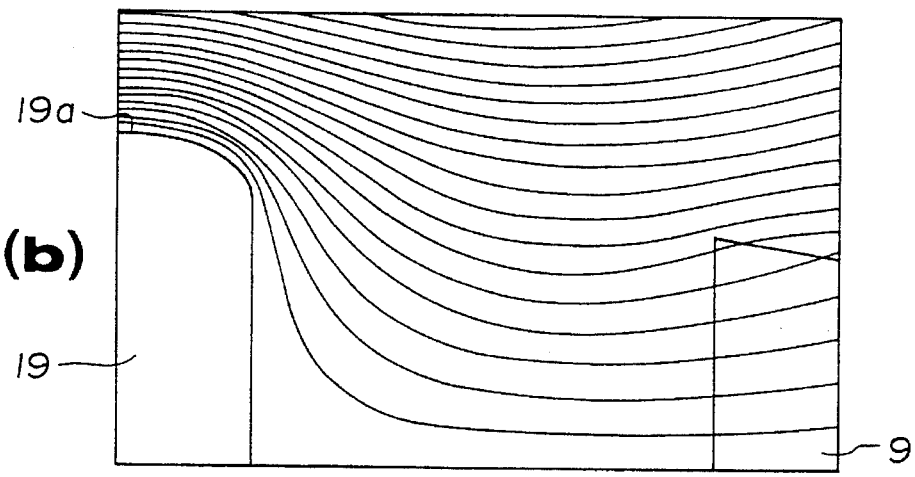
Figure 6C:
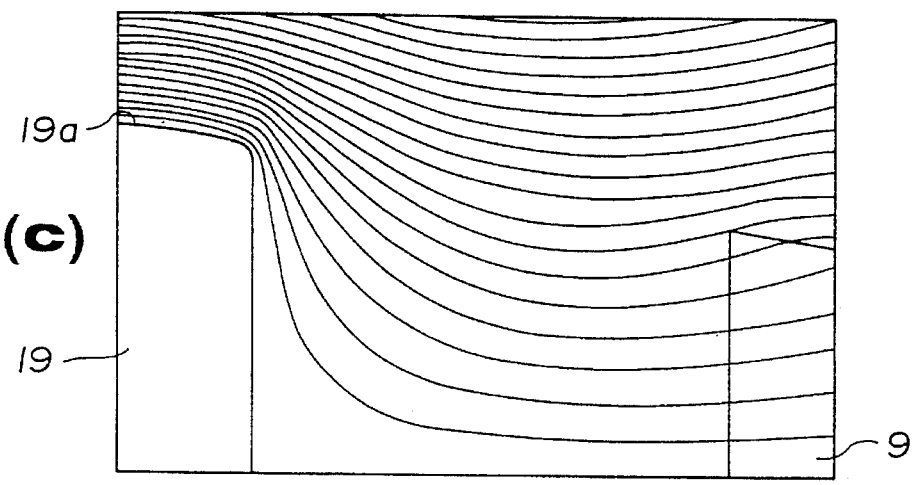

FIGS. 5(a)–(c) show a second embodiment in which electrodes 18 and 19 are used in place of the conventional electrodes 6 and 7, respectively. The electrode 19 is characterized in that a part of the contour shade of the section of the electrode 19 perpendicular to the longitudinal axis of the laser chamber 1 and confronting the electrode 18 has a shade of an elliptical arc. The sections of the electrodes 18 and 19 are in lateral symmetry. Therefore, the potential distribution during the operation of the laser device is in lateral symmetry around the center axis of the sections. In FIGS. 5(a)–(c), the potential distribution for only the typical right-hand portions of the electrodes 18 and 19 is shown.

The upper portion of FIGS. 5(a)–(c) shows the cathode electrode 18 having an arcuate confronting surface 18a with a radius of 13 mm while the lower portion of FIGS. 5(a)–(c) shows the anode electrode 19 having a width of 8 mm and an confronting surface 19a formed as an elliptical arc, as mentioned above. This second embodiment is constructed such that the width of the anode electrode 19 coincides with the length of the longer diameter of the ellipse while the center axis of the section coincides with the shorter diameter of the ellipse. The distance between the cathode and anode electrodes 18 and 19 is assumed to be 25 mm. That is, the width of the electrodes are less than the distance between the electrodes.

FIG. 5(a) shows the result of a numerical analysis performed when the ratio r of longer diameter/shorter diameter of an ellipse involving the confronting surface 19a of the anode electrode 19 is 1, that is, when the confronting surface 19a is an arc. FIG. 5(b) shows the result of a numerical analysis performed when r=2. FIG. 5(c) is the result when r=4. It is to be noted that (a), (b) and (c) of each of FIGS. 5–9 show that the ratio of the longer diameter/shorter diameters r= 1, 2 and 4, respectively. While the tendency of all the equipotential lines is similar to that of those conventional ones shown in FIG. 25(a), the potential gradient is increased because the equipotential lines in the vicinity of the anode 19 are pushed up by the rod-like electrode, so that the potential gradient at the electrode upper end portion (the central axis portion) is high. This situation will be better understood in FIGS. 6(a)–(c) which show the vicinity of the anode 19 on enlarged scale.

Figure 7A:
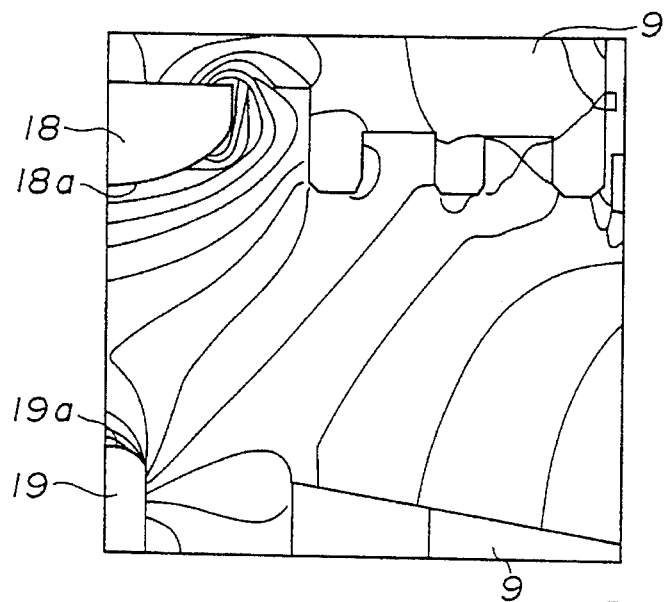
FIGS. 7(a)–(c) show the distribution of a field strength in the second embodiment.
Figure 7B:
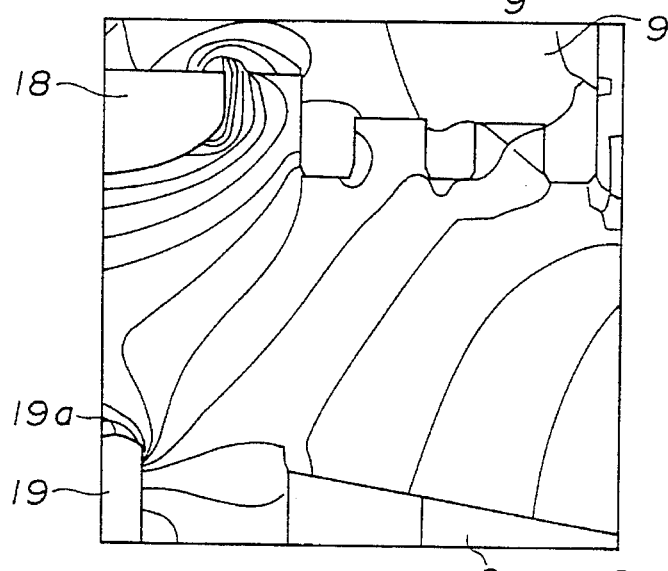
Figure 7C:
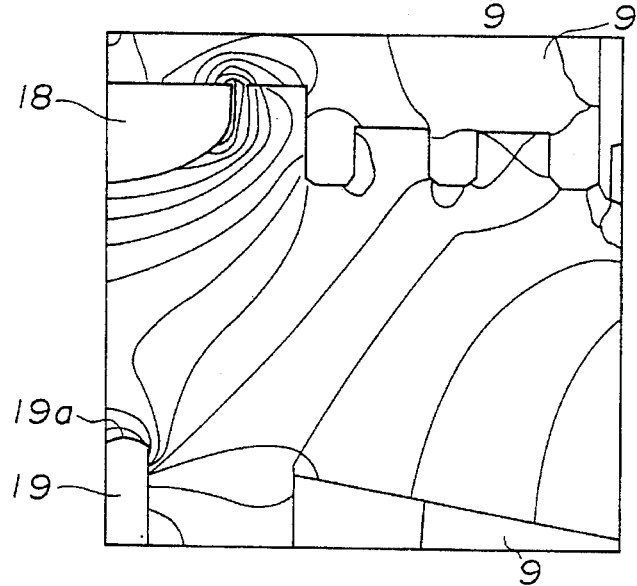
Figure 8A:
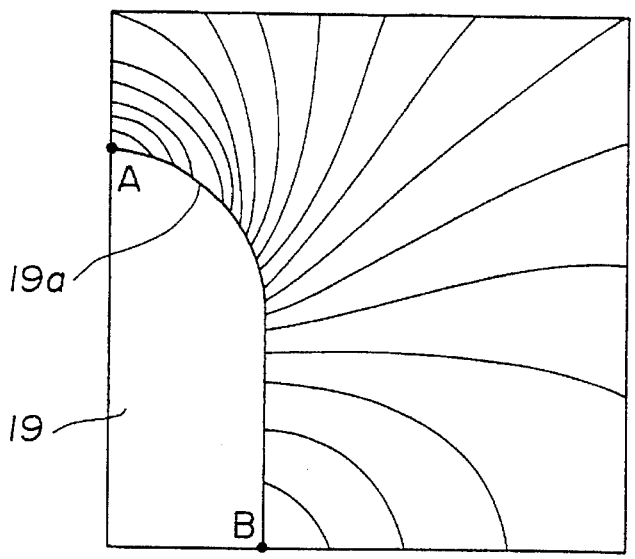
FIGS. 8(a)–(c) show the distribution of a field strength in the vicinity of the anode electrode of FIG. 7.
Figure 8B:
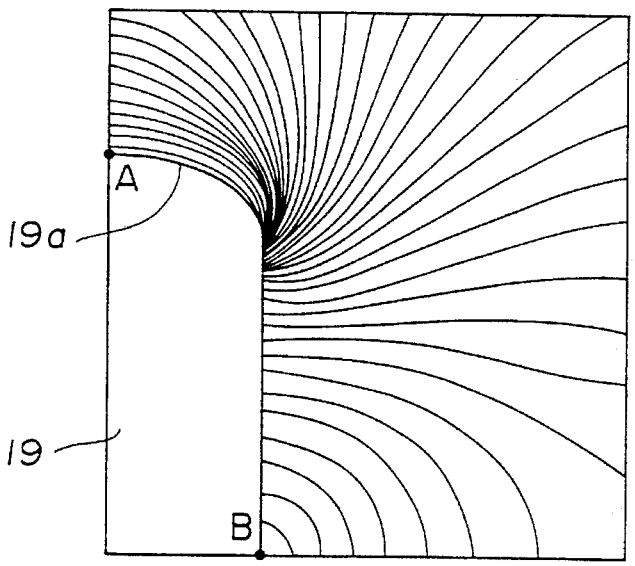
Figure 8C:
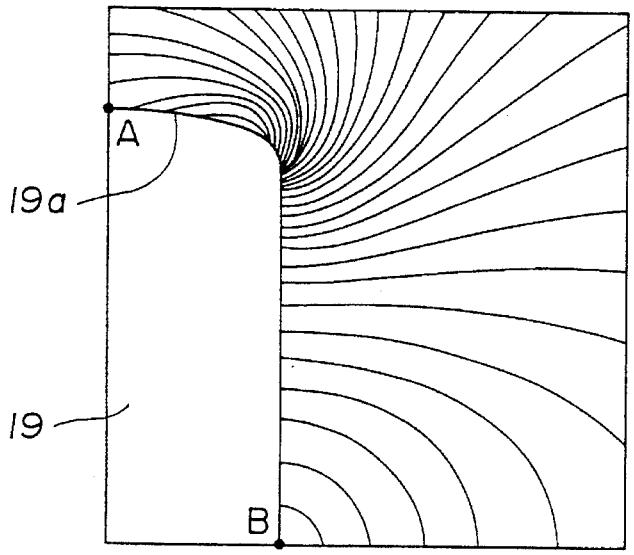
Figure 9A:
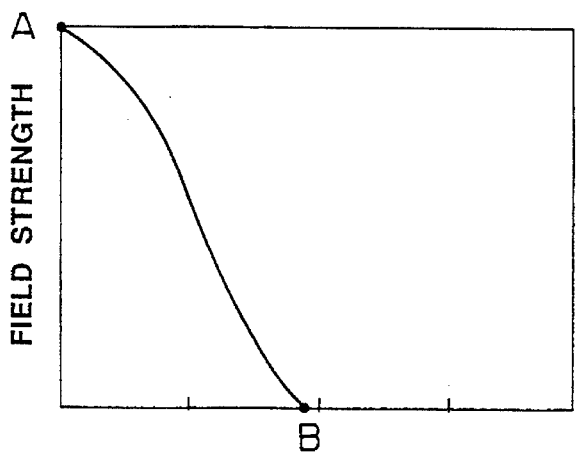
FIGS. 9(a)–(c) show a change in a field strength on the confronting surface of the anode electrode of FIG. 8.
Figure 9B:
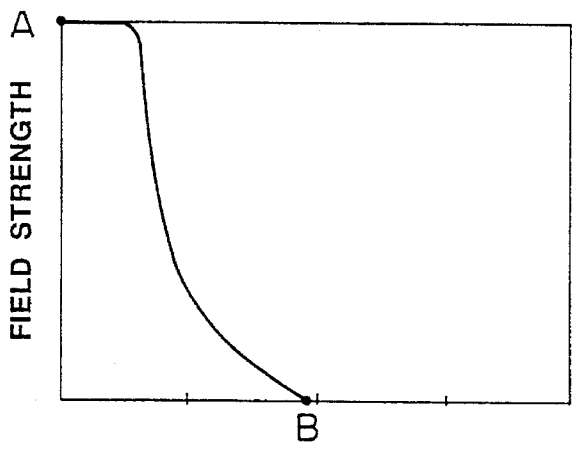
Figure 9C:
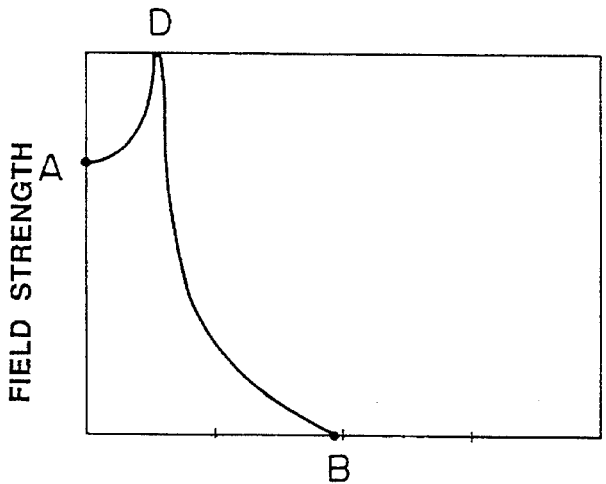

FIGS. 7(a)–(c) show the distribution of field strength. FIGS. 8(a)–(c) show the details of the field strength distribution in the vicinity of the anode electrode 19. FIGS. 9(a)–(c) show a change in the field strength E on the surface of the electrode 19. As will be seen from these figures, when the cross section of the electrode is a complete circle in (a) of these figures, the field strength is high at the electrode upper end portion (central portion) and decreases rapidly toward the right-hand end to thereby provide a sharpened distribution. When the cross section of the electrode is an ellipse (the ratio of the longer diameter/shorter diameter r=2) in (b), a field distribution is provided in which a slight concavity is formed at the upper end with a flat uniform field strength width of about 6 mm. It will be understood that the absolute values of the field strength at the electrode upper end portions increase in the order of (a), (b) and (c). As the ellipse becomes oblater, the central field strength decreases and the field strength at the shoulder of the uniform field strength region conversely increases.

Now assume that the operator turns on an operation switch to start the operation of the laser device and discharge starts thus from the state of the ellipse (the ratio of longer diameter/shorter diameter r=2) in (b). Since the field is considerably uniform and the discharge extends through the overall elliptical arc portion 19a of the electrode 19, the abrasion of the electrode 19 increases simultaneously through the overall electrode elliptical portion 19a. As will be seen in FIG. 9(b), since a more local discharge current flows through the central portion where a stronger field exists, that portion is abraded more rapidly. The situation then comes close to the state of (c) and the field in the vicinity of the center point A becomes lower and abrasion is decreased. Now, the field of the periphery D of the central portion increases, a more discharge current flows through this periphery D where the increased field exists to thereby abrade the electrode more rapidly. The situation then returns to the state of (b). In this manner, the discharge portion is settled to take a stabilized shape between (b) and (c). Since a self-shape maintenance mechanism operates due to a kind of negative feedback, a long time stabilized operation is performed while maintaining a uniform field region constant without changing the discharge width WA. This is clarified by the result of the numerical analysis.

When the ratio of the longer diameter/shorter diameter r is small, the field strength E is high in the vicinity of the electrode central point A and rapidly decreases toward the periphery of the central portion, so that discharge is concentrated at the narrow central region. If r increases excessively, the field strength E increases in the periphery of the central portion and the discharge is likely to be concentrated on the peripheral portion of the electrode. Thus, there is an optimal value of r where discharge is not locally concentrated. In an experiment where r=2, the field strength became constant through substantially the overall region of the confronting surface 19a of the electrode 19 and a discharge width WA was obtained which was substantially the same as the length of the electrode width.

As described above, when the confronting surface 19 a of the electrode 19 is formed with an optimal ratio of the longer diameter/shorter diameter to thereby operate the laser, discharge extends through substantially the overall electrode elliptical portion 19a and abrasion increases simultaneously through the overall surface of the electrode elliptical portion 19a. Even if there is a local strong field, a more discharge current flows through that portion, which is abraded more rapidly. A kind of negative feedback mechanism operates in which the field at that portion and hence abrasion is decreased. Therefore, the uniform field region is constant for a long time to thereby provide a stabilized operation without changes in the discharge width. Such experimental results coincide substantially well with the result of the above numerical analysis, advantageously.

While in this second embodiment a constant field strength is obtained through the overall surface of the electrode elliptical portion 19a when the ratio of longer/shorter diameters r=2 to thereby obtain a discharge width WA which is the same as the electrode width, this optimal value changes depending on the overall width, inter-electrode distance, and geometrical layout of the electrodes, the permittivity of the insulating member, and the nature of the discharge medium gas, so that the optimal value should be obtained depending on the situation.

While in the second embodiment only the anode electrode 19 is shown as having a discharge width WA which is the same as the electrode width, the electrodes 18' and 19' on both sides may be provided so as to have electrode widths which are the same as the discharge width WA, as shown in FIG. 10, to thereby produce effects similar those produced by the second embodiment.

While in the second embodiment the confronting surface is illustrated having an elliptical form, the present invention is not limited to it. Even if the confronting surface has a configuration other than an elliptical arc, it may be used as long as the field strength distribution is uniform on the confronting surface. As an example, an optical surface 20a of the electrode 20 may be defined by a combination of an arc and a straight line, as shown in FIG. 11(a). Alternatively, as shown in FIG. 11(b), the electrode confronting surface 21a may be defined by a combination of an ellipse and straight lines. Furthermore, the confronting surface may be formed of a curved line of a smooth function system. In these cases, if straight lines or a curved line and a straight line are connected smoothly, field concentration is difficult to occur to thereby prevent the occurrence of surface discharge or unnecessary discharge.

Figure 12A:
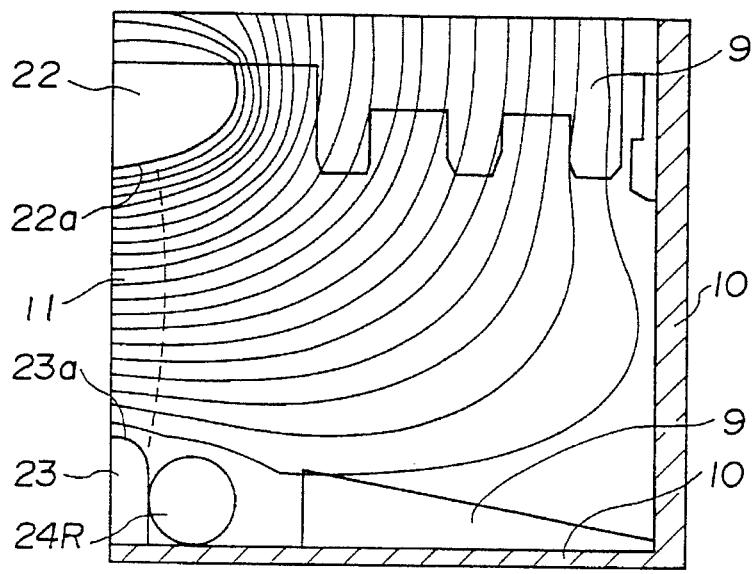
FIGS. 12(a)–(c) show the distribution of equipotential lines in the vicinity of electrodes used in a third embodiment of a laser device according to the present invention.
Figure 12B:
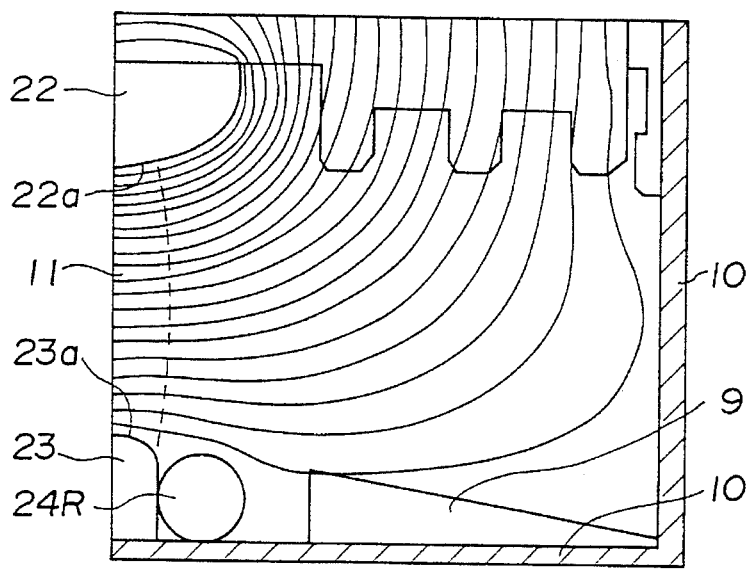
Figure 12C:
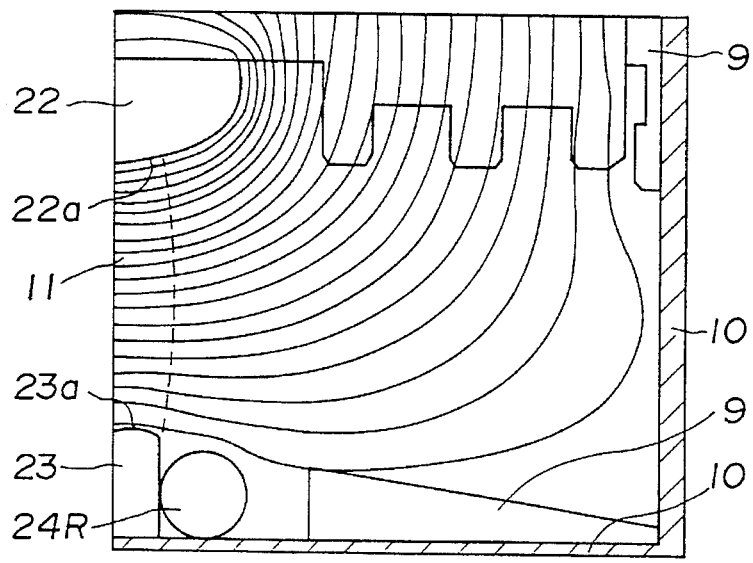
Figure 13A:
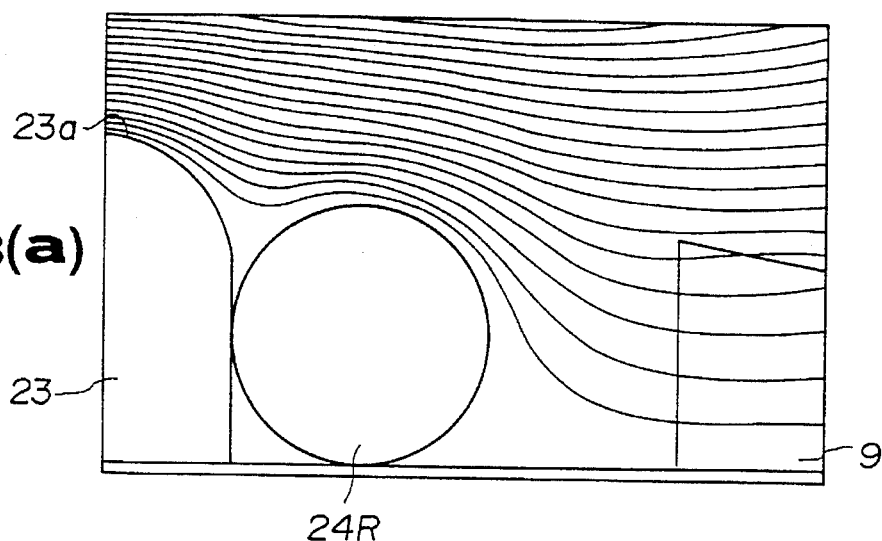
FIGS. 13(a)–(c) show the distribution of equipotential lines in the vicinity of the anode electrode of FIGS. 12(a)–(c)
Figure 13B:
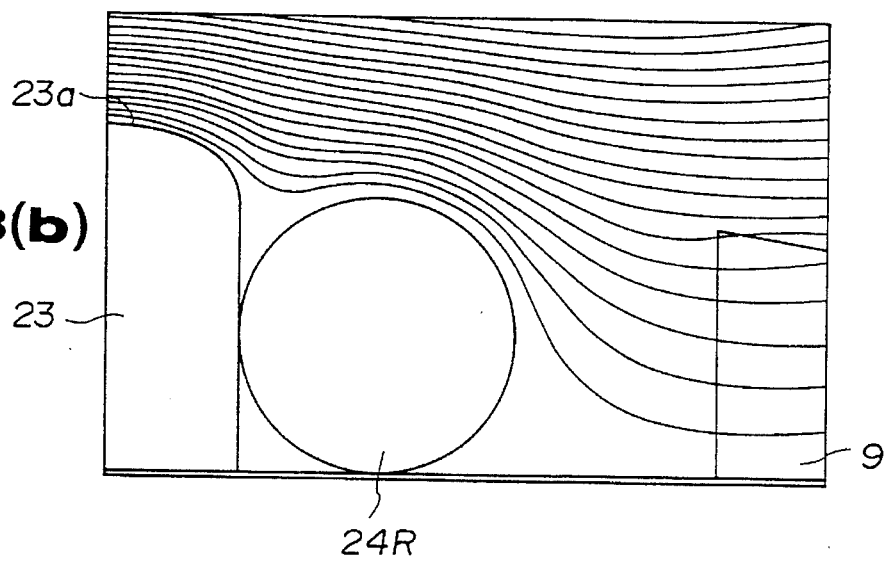
Figure 13C:
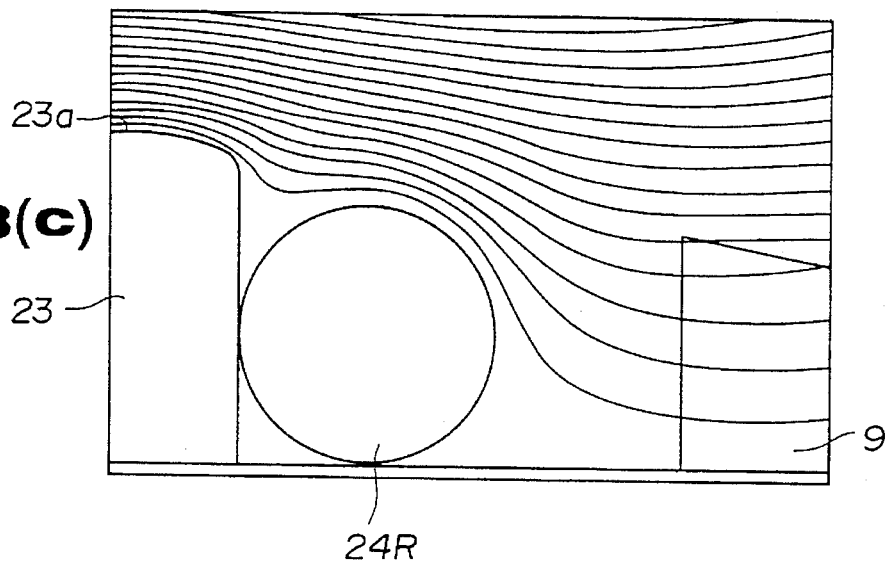

A third embodiment will be described next. In the third embodiment, electrodes 22 and 23 are used as shown in FIGS. 12(a)–(c) in place of the conventional electrodes 6 and 7, respectively. The electrode 23 is characterized in that part of the contour shape of the cross section of the electrode 23 perpendicular to the direction of longitudinal axis of the laser chamber 1 and confronting the electrode 22 has the shape of an elliptical arc. It is further characterized in that a column-like metal structure 24 having a circular cross section which reduces the electric field strength (hereinafter referred to as a field easing electrode) is provided on each of the right and left sides of the electrode 23. In FIGS. 12(a)–(c), the right-hand side one is denoted by 24R while the left-hand side one is denoted by 24L (not shown). The cross sections of the electrodes 22 and 23 are in lateral symmetry, so that the potential distribution occurring during the operation of the laser device is in lateral symmetry around the mid-axis of the cross section.

FIGS. 12(a)–(c) show the potential distribution for only the right-hand side portions of the electrodes 22 and 23. The upper portions of FIGS. 12(a)–(c) show a cathode electrode 22 having an arcuate confronting surface with a radius of 13 mm while the lower portions of FIGS. 12(a)–(c) show an anode electrode 23 having an elliptical confronting surface 23a with a transverse electrode width of 8 mm. In the third embodiment, the transverse width of the electrode 23 is formed such that it coincides with the length of the longer diameter of the ellipse and the vertical center axis of the electrode 23 coincides with the shorter diameter axis of the ellipse. The distance between the cathode and anode electrodes 22 and 23 is assumed to be 25 mm. Thus, the transverse width of the electrode 23 is less than the distance between the electrodes. The transverse surface of the field easing electrode 24R on the right-hand side of the anode electrode 23 is a circle with a diameter of 8 mm and connected electrically with the electrode 23. This applies to the field easing electrode 24L on the left side of the anode electrode 23. That is, the field easing electrode 24 is such that it is lower than the confronting surface of the electrode 23. Since the electrodes 22, 23 perform discharge therebetween, the materials of the electrodes are required to be a high melting point metal having high resistance to discharge. The field easing electrodes 24R and 24L do not perform discharge and are only required to be maintained at a static electrical potential, so that they are not necessarily required to be made of a high melting point metal having resistance to discharge. Thus, they may be made of a metal material different from those of the electrodes 22 and 23.

FIG. 12(a) shows the result of the numerical analysis when the ratio of the longer diameter/shorter diameters r of an ellipse involving the anode electrode confronting surface 23a is 1 or when the confronting surface 23a is an arc. FIG. 12(b) shows the result when the ratio r=2 while FIG. 12(c) shows the result when the ratio r=4. It is to be noted that (a), (b) and (c) of FIGS. 13–19 show the cases where the ratios of the longer diameter/shorter diameter r=1, 2 and 4, respectively.

While the tendency of the overall equipotential lines is similar to that of the conventional ones shown in FIG. 23(a), the equipotential lines in the vicinity of the anode 23 are pushed up by the field easing electrode 24R and the potential gradient at the electrode upper end portion (center axis portion) is low. This will be better understood from FIGS. 13(a)–(c) which show the vicinity of the anode 23 on enlarged scale.

Figure 14A:
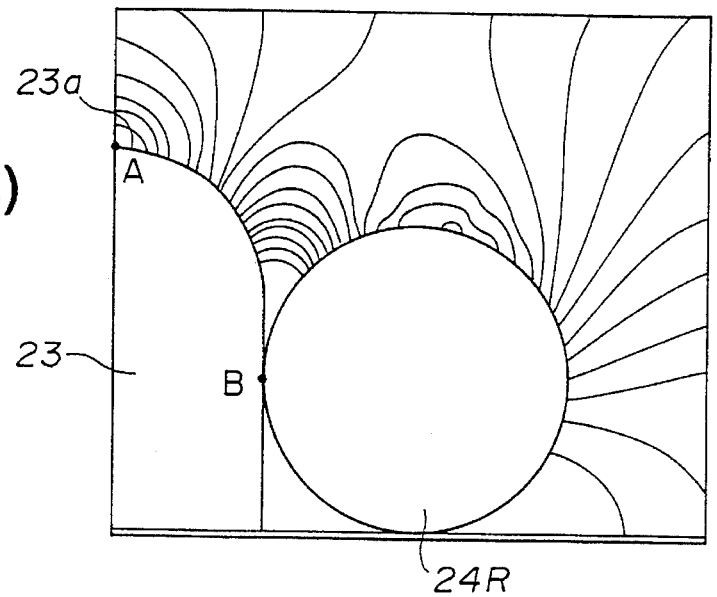
FIGS. 14(a)–(c) show the distribution of a field strength in the vicinity of the anode electrode of FIGS. 12(a)–(c)
Figure 14B:
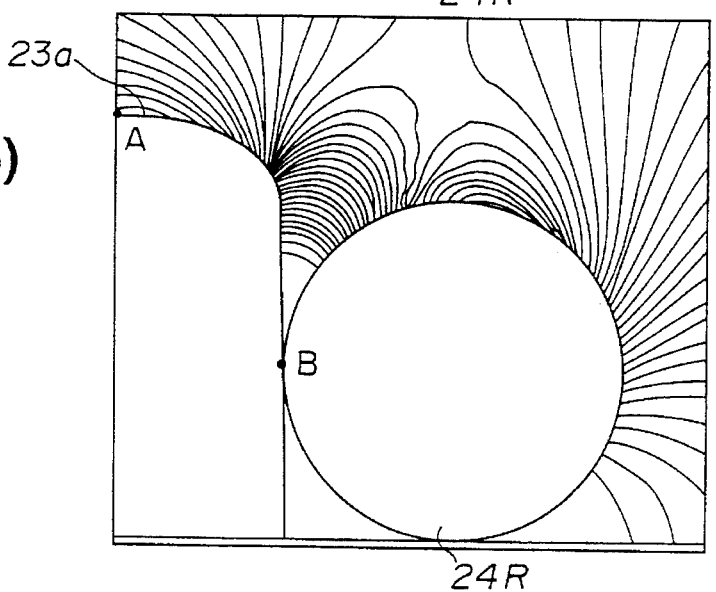
Figure 14C:
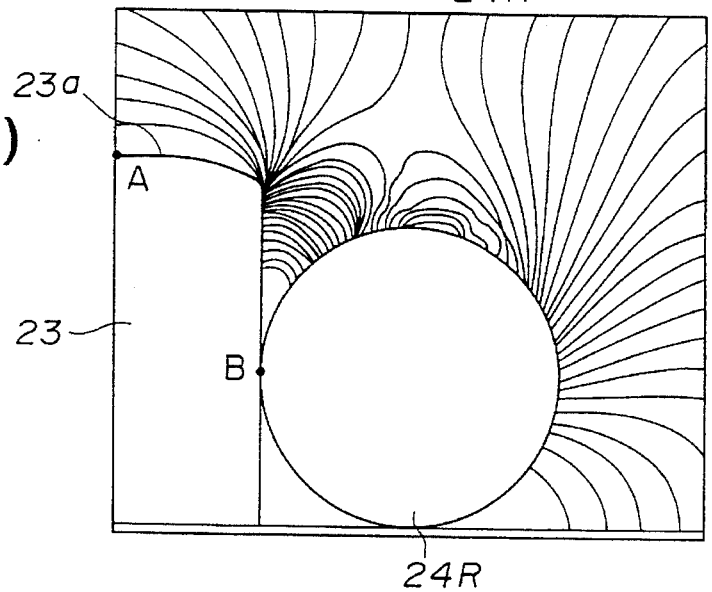
Figure 15A:
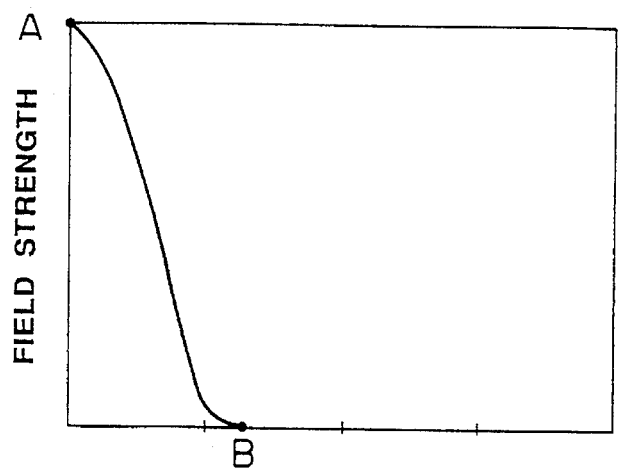
FIGS. 15(a)–(c) show a change in a field strength on the confronting surface of the anode electrode of FIGS. 14(a)–(c)
Figure 15B:
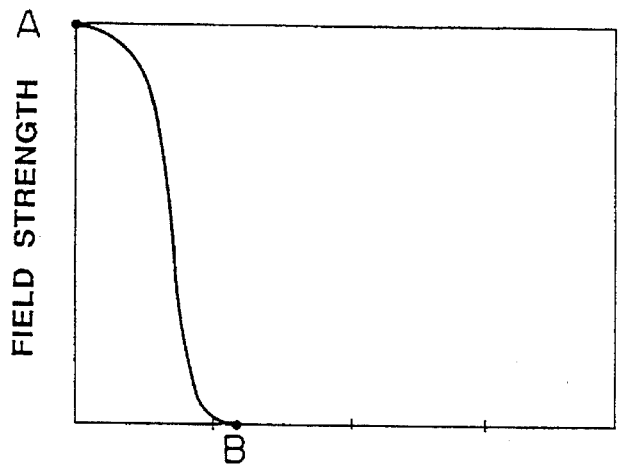
Figure 15C:
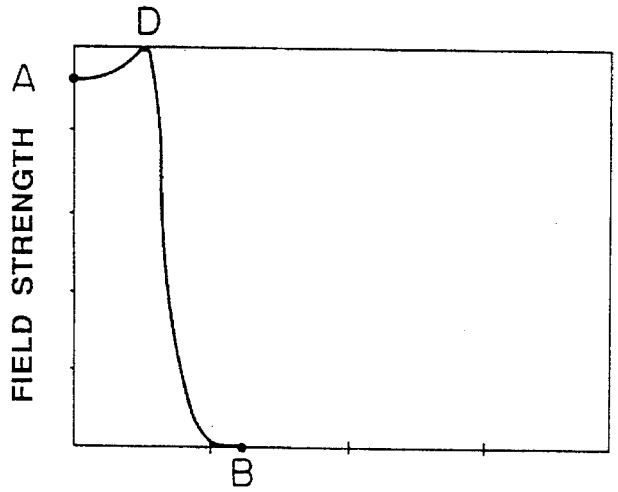

FIGS. 14(a)–(c) show the details of the field strength distribution in the vicinity of the anode electrode 23, and FIGS. 15(a)–(c) show a change in the field strength E on the surface of the electrode 23. When the cross section of the electrode is a true circle in (a), the field strength is high at the central point A of the electrode 23 and rapidly decreases toward its right-hand end to thereby provide a sharpened distribution. When the cross section of the electrode is an ellipse (the ratio of the longer diameter/shorter diameter r=2) in (b), the field distribution is flatter than that in the vicinity of the central point A in (a). In the case of an ellipse (the ratio of the longer diameter/shorter diameter r=4) in (c), conversely, the field strength in the vicinity of the central point A is lower than that at the periphery D of the central portion.

Figure 16A:
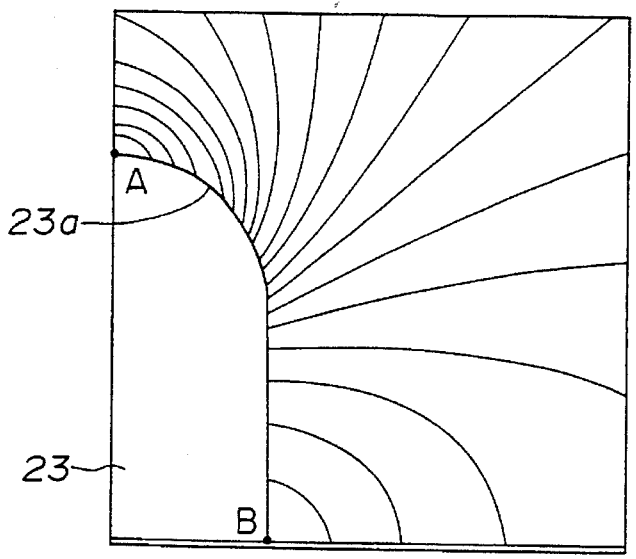
FIGS. 16(a)–(c) show the distribution of a field strength in the vicinity of the anode electrode when a field easing electrode is provided.
Figure 16B:
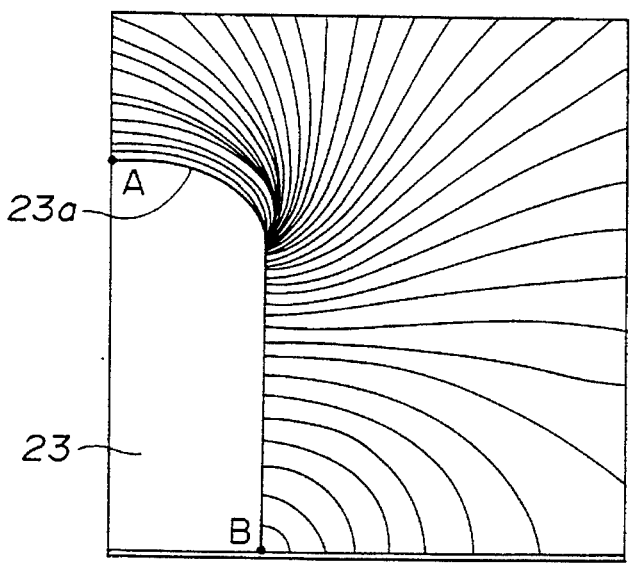
Figure 16C:
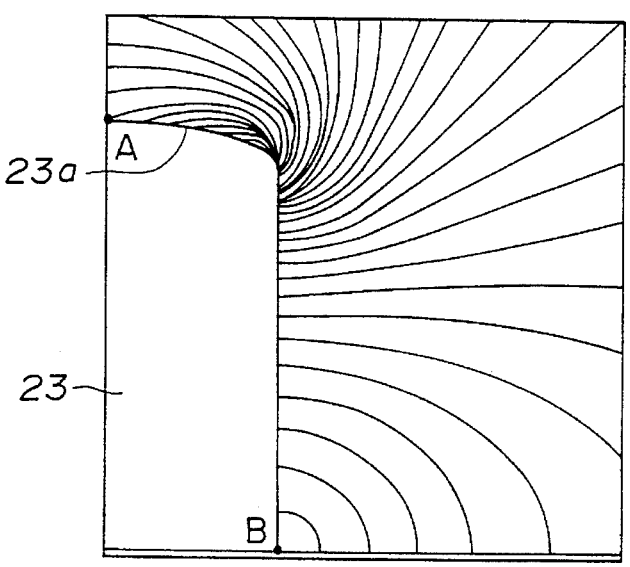
Figure 17A:
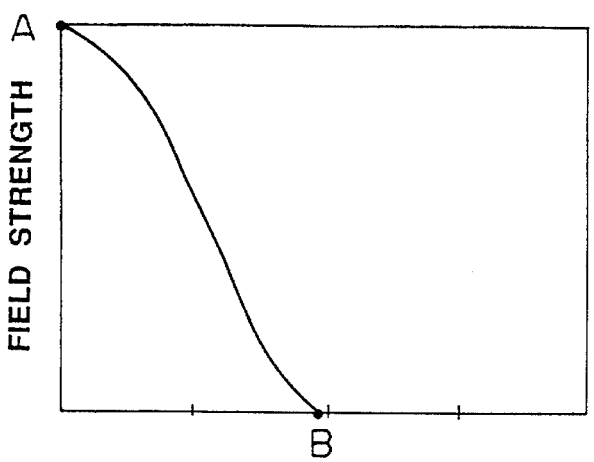
FIGS. 17(a)–(c) show a change in a field strength on the confronting surface of the anode electrode of FIGS. 16(a)–(c)
Figure 17B:
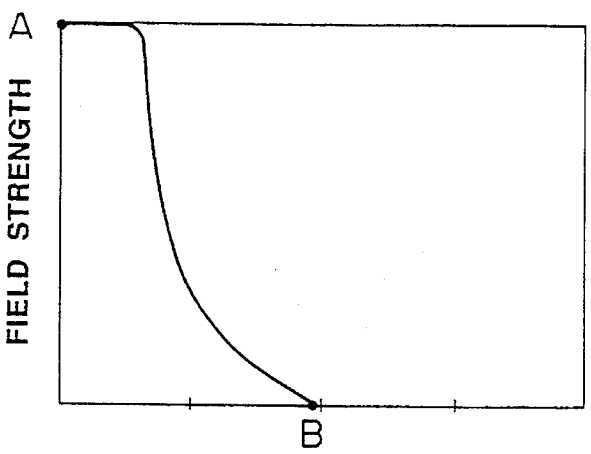
Figure 17C:
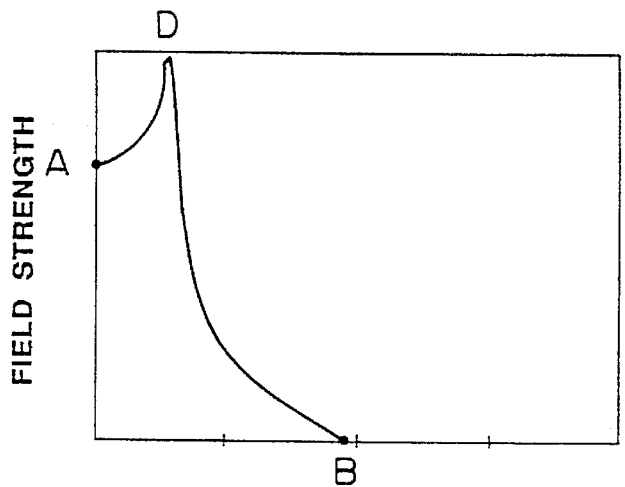

The advantages produced by provision of the field easing electrode 24 will be described below. FIGS. 16(a–c), 17(a–c) show the details of the field strength distribution in the vicinity of the anode electrode 23 where no field easing electrode 24 is disposed and a change in the field strength E on the surface of the electrode 23, respectively. As will be obvious from the comparison between FIGS. 16(a–c), 17(a–c) and FIGS. 14(a–c) and 15(a–c), the provision of the field easing electrode 24 reduces the field in the periphery D of the central portion of the anode electrode 23, that is, the difference in field magnitude between the central point A and the periphery D is small.

The absolute values of the field strength at the upper end portions of the anode electrode 23 are large in the order of (a), (b) and (c). It will be seen that as the ellipse becomes flatter, the field strength at the central point A decreases and the field strength at the periphery D conversely increases. The field strength at the central point A of the anode electrode 23 is uniformly reduced when the field easing electrode 24 is provided compared to the case where no field easing electrode is provided.

Assume now that the operator turns on the operating switch to start the operation of the laser device and discharge starts in the state of (b). Since the field is considerably even through a wide range of the central portion of the confronting surface 23a and discharge extends over the overall elliptical portion 23a of the electrode 23, the abrasion of the electrode 23 increases simultaneously through the overall surface of the electrode elliptical portion 23a.

As will be seen in FIG. 15(b), a larger current flows locally through the region where the field is strong in the vicinity of the central point A, so that this region is abraded more rapidly. Then, the state of (c) appears and the field in a region in the vicinity of the central point is reduced to thereby decrease the abrasion of the electrode. Now, the field strength in the periphery D of the central portion increases and a more discharge current flows through the periphery D where the field is strong to thereby abrade the electrode more rapidly. In this manner, the state of (b) is recovered and the shade of the discharge is thus settled at a stabilized one between (b) and (c). Since a self-shape maintaining mechanism works by a kind of negative feedback, a uniform field is maintained in a predetermined region to thereby operate the laser for a long time in a stabilized manner without changing the discharge width WA. This was clarified by the result of the numerical analysis.

Experiments showed that if the ratio of the longer diameter/shorter diameter r is smaller, the field strength E is higher at the central point A of the electrode and rapidly decreases toward its periphery D, so that discharge is concentrated in the central narrow region. If the ratio of the longer diameter/shorter diameters r is large excessively, the field strength E increases at the periphery D of the central portion and hence discharge is likely to be concentrated in the periphery portion.

The ratio of the longer diameter/shorter diameters r has an optimal value where no discharge is concentrated in a single place. In experiments, when the ratio of the longer diameter/shorter diameter r=3, the field strength became substantially even through the electrode width to thereby obtain a discharge width WA substantially equal to the electrode width. If the confronting surface 23a of the electrode 23 is formed with such optimal ratio of the longer diameter/shorter diameters r and the laser is operated, discharge extends through substantially the overall surface of the electrode elliptical portion 23a, so that abrasion simultaneously advances through the overall surface of the electrode elliptical portion 23a.

Even if there is a local intense field, a more discharge current flows therethrough to thereby abrade that portion more rapidly. A kind of negative feedback mechanism operates where the field strength and hence abrasion soon decreases. Therefore, a uniform field is maintained in a region determined by the electrode width for a long time to thereby operate the laser device with a constant discharge width.

The advantages produced by the provision of such field easing electrode 24 will be described below. If no field easing electrode 24 is provided, the field strength on the surface of the anode electrode 23 increases and much contaminations are produced from the electrode 23, disadvantageously. However, the provision of such field easing electrode 24 reduces this problem. The electrical intensity distribution on the surface of the anode electrode 23 changes greatly depending on the shape of the anode electrode 23. If no field easing electrode 24 was provided, an unstable discharge often occurred at the start up of the laser operation. However, this was improved by the provision of the field easing electrode 24. Such experiment coincides advantageously with the result of the numerical analysis and is proved appropriate.

While in the third embodiment a constant field strength is obtained through the overall surface of the electrode elliptical portion 23a with the ratio of the longer diameter/shorter diameters r=3 to provide a discharge width WA which is the same as the electrode width, this optimal value changes depending on the overall width, inter-electrode distance, and geometrical layout of the electrodes, the permittivity of the insulating member, and the nature of the discharge medium gas, so that the optimal value is required to be obtained depending on the situation.

Figure 18A:
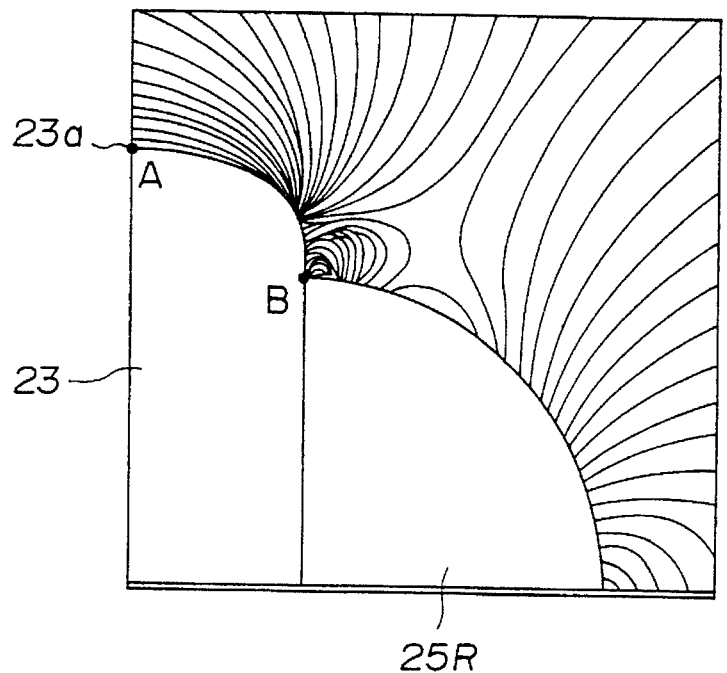
FIGS. 18(a) and (b) show the distributions of a field strength in the vicinity of the anode electrode when an field easing electrode having a quadrant cross section is provided.
Figure 18B:
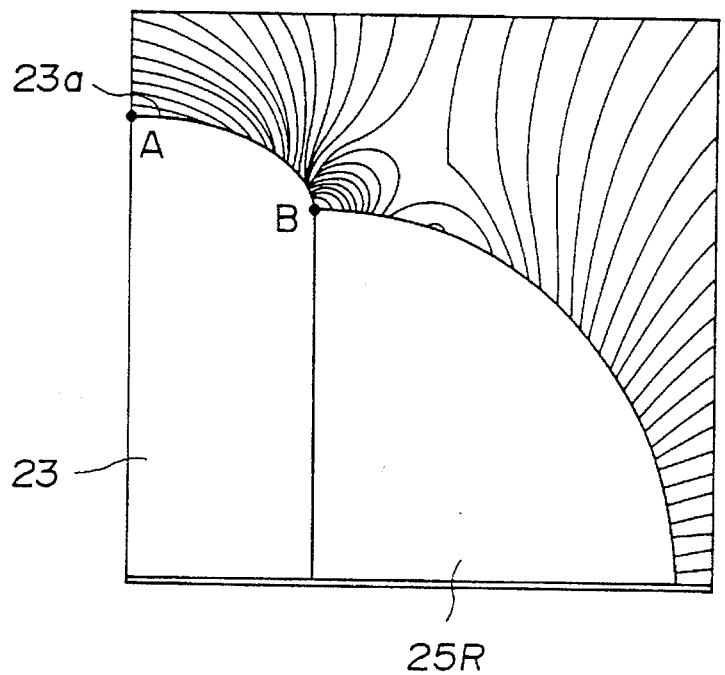
Figure 19A:
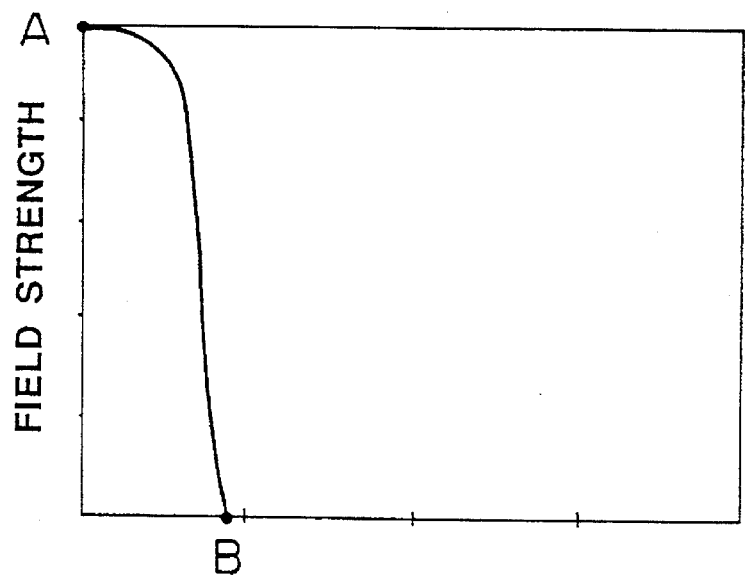
FIGS. 19(a) and (b) show changes in field strengths on the corresponding confronting surfaces of the anode electrodes of FIGS. 18(a) and (b)
Figure 19B:
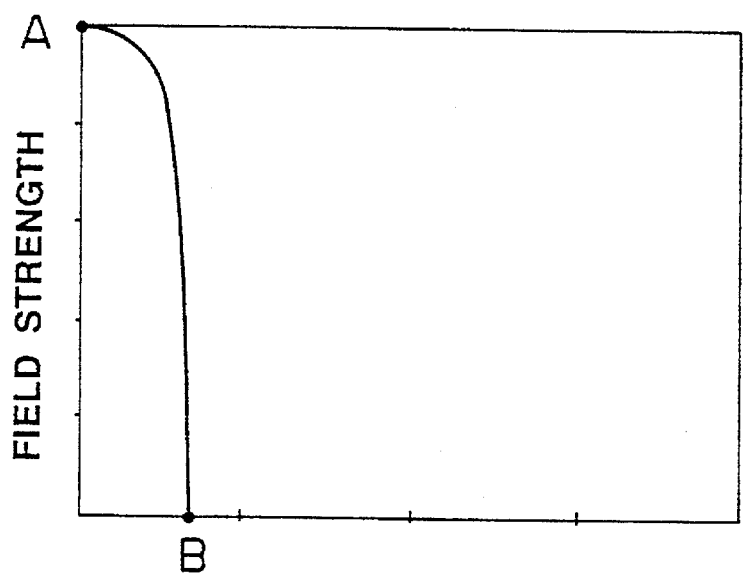

While in the third embodiment the cross-section of the field easing electrode 24 is shown as a circle, the present invention is not limited to this particular configuration, and a field easing electrode 25 may have a cross-section of a quadrant as shown in FIGS. 18(a) and 18(b). It will be seen that FIGS. 18(a), 18(b) and 19(a), 19(b) correspond to FIGS. 14(a–c) and 15(a–c), respectively and produce similar effects.

Figure 20A:
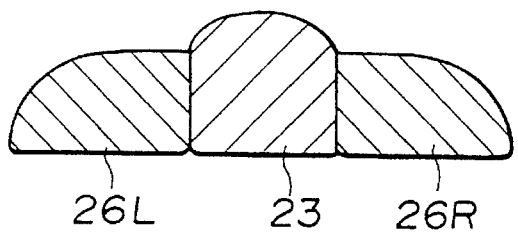
FIGS. 20(a) and (b) show other examples of the field easing electrode.
Figure 20B:
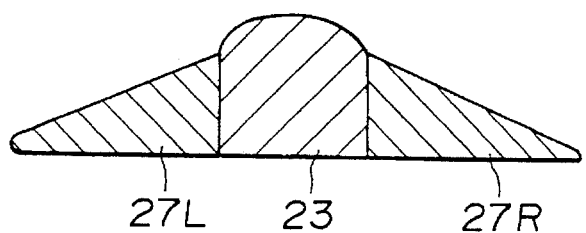
Figure 21:
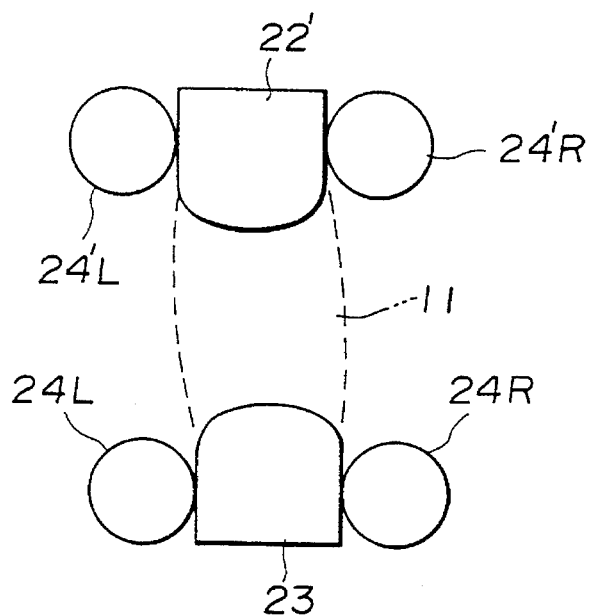
FIG. 21 shows the cross sections of the confronting electrodes to which the third embodiment of the present invention is applied.

The sectional configuration of the field easing electrodes is not limited to that of the third embodiment. It may be a combination of an elliptical arc and a straight line as shown by a field easing electrode 26 in FIG. 20(a) or a combination of an arc and a straight line as shown by a field easing electrode 27 in FIG. 20(b).

Alternatively, another possible sectional configuration may be an ellipse or a curve belonging to a smooth function system. In any case, a smooth connection of straight lines or a curve and a straight line renders field concentration difficult to occur to thereby prevent surface discharge and unnecessary discharge. In summary, the field easing electrode is only required to be disposed on both sides of the discharge electrode.

Provision of a field easing electrode on each side of the discharge electrode allows the cathode electrode and the anode electrode alone to be exchanged, if necessary, and no field easing electrodes are required to be exchanged. Therefore, the exchanging cost and electrode manufacturing cost are reduced advantageously compared to the case of the anode electrode and cathode electrodes being each made of a single member.

While in the third embodiment the anode electrode 23 alone is arranged to have the discharge width WA which is the same as the electrode width and the field easing electrode 24 is provided, both the electrodes 22' and 23 may have their respective confronting surface formed so as to obtain the discharge width WA which is the same as the electrode width and field easing electrodes 24' and 24 may be disposed corresponding to the electrodes 22' and 23, respectively to thereby produce advantages similar to those produced by the third embodiment.

Figure 22A:
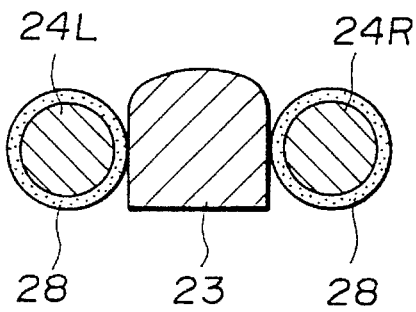
FIGS. 22(a) and (b) show a field easing electrode covered with an insulating film.
Figure 22B:
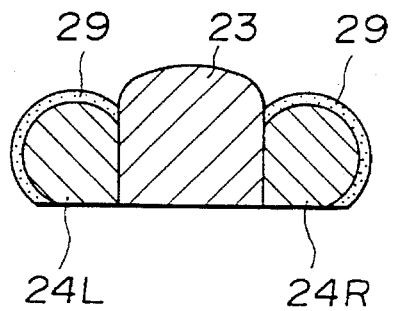

The material of the field easing electrodes may be metal, ceramics or plastic if it is a conductive material. The field easing electrode 24 is only required to maintain a potential in a static manner and may be covered all with an insulating tube 28, as shown in FIG. 22(a). Alternatively, as shown in FIG. 22(b), the field easing electrode 24 may be covered partially with an insulating material 29 and connected electrically (capacitatively, inductively or resistively) with the electrode 23.

While in the third embodiment the field easing electrode is separately provided in addition to the discharge electrode on each side of the discharge electrode, these elements may be molded integrally with each other.

As described above, according to the present invention, the discharge pumped type laser device can be operated in a stabilized manner for a long time without changing the discharge width. Therefore, the use of the present laser device for material working ensures stabilized material working in a stabilized manner for a long time without changes in the beam width and transverse mode and is very advantageous from a standpoint of practical use. The use of a wavelength selective device within the resonator of the present laser device or in a part of the laser device makes realized a narrow band oscillation laser where fluctuations in the spectrum width are very small. Long time stabilization of the oscillation spectrum width which is the problem with the conventional laser lithography is achieved, which is very useful in practical operations.

What is claimed is:

1. A laser device of the type in which electric discharge takes place between a pair of electrodes to excite a laser gas in the laser chamber thereby producing a laser beam, wherein the width of at least one of the pair of electrodes is substantially equal to the width of the electric discharge and wherein there is further provided a pair of conductor members and means for maintaining said pair of conductor members at an electrical potential equal to an electrical potential of one of the pair of electrodes during said discharge, said conductor members being disposed on respective side of said at least one of the electrodes along the longitudinal axis of said one electrode.

2. A laser device according to claim 1, wherein a part of the contour shape of a section perpendicular to the longitudinal axis of the chamber in at least one of the electrodes, which part confronts the other one of the electrodes, has a shape of an elliptical arc, longer diameter thereof being equal to the width of said at least one of the pair of electrodes and shorter diameter thereof being coincident with a vertical center axis of the section of said at least one of the electrodes.

3. A laser device according to claim 2, wherein the ratio of the longer diameter to the shorter diameter of the ellipse falls within a range between one and four.

4. A laser device according to claim 1, wherein the width of said at least one of the electrodes is less than the distance between the pair of electrodes.

5. A laser device according to claim 1, wherein the material of the conductor members differs from that of the electrodes.

6. A laser device according to claim 1, wherein each of the conductor members is enclosed in an insulating tube.

7. A laser according to claim 1, wherein a part of the surface of each of the conductor members is covered with an insulating film.

8. A laser according to claim 1, wherein contour shape of a section of each of the conductor members perpendicular to the longitudinal axis of the laser chamber is circular or a combination of a circular arc and a straight line.

9. A laser device according to claim 1, wherein the laser device includes an optical resonator provided with a wavelength selective device for reducing a bandwidth of the oscillating wavelength of the laser beam.

* * * * *